(12) United States Patent
Tamamoto et al.

(10) Patent No.: US 6,273,267 B1
(45) Date of Patent: Aug. 14, 2001

(54) ARTICLE DELIVERY SYSTEM

(75) Inventors: Junichi Tamamoto, Ibaraki-ken; Toshihiko Tajiri, Aichi-ken; Takashi Yoshida, Ibaraki-ken, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/398,775

(22) Filed: Sep. 20, 1999

(30) Foreign Application Priority Data

Mar. 17, 1999 (JP) ................................................ 11-071414

(51) Int. Cl.[7] ........................................................ B07C 5/00
(52) U.S. Cl. ............................ 209/547; 209/546; 209/552; 209/555
(58) Field of Search .................................... 209/546, 547, 209/552, 555

(56) References Cited

U.S. PATENT DOCUMENTS 5,523,954 * 6/1996 Weaver et al. ....................... 364/478
5,697,504 * 12/1997 Hiramatsu et al. ................... 209/546

FOREIGN PATENT DOCUMENTS 7185471   7/1995  (JP) .

* cited by examiner

*Primary Examiner*—Donald P. Walsh
*Assistant Examiner*—Mark J. Beauchaine
(74) *Attorney, Agent, or Firm*—Antonelli, Terry, Stout & Kraus, LLP

(57) ABSTRACT

In an article delivery system, articles each having sorting information are handled, and the articles are arranged in proper delivery order through a plurality of arrangement paths so as to help the delivery of the articles. This system includes a sorting information procuring device for procuring the sorting information of each article, an article information storage device which is connected to the sorting information procuring device, and collects and stores the sorting information, a database for providing the order of arrangement of the sorting information, an information processing device for arranging the sorting information in the order, provided by the database, while including information for distinguishing the arrangement paths from each other, and delivery order forming device having a communication device for transmitting the sorting information arranged by the information processing device.

14 Claims, 21 Drawing Sheets

FIG. 12

| DEVICE NO. | ARTICLE NO. | IDENTIFICATION NO. | SORTING INFORMATION | IMAGE | (LINE NO.) |
|---|---|---|---|---|---|
| 1 | 1 | 110001 | 3-1,A TOWN,T CITY,I PREFECTURE | FILE 110001 | (12-1) |
| 1 | 1 | 110002 | 1-5,B TOWN,T CITY,I PREFECTURE | FILE 110002 | (12-2) |
| 1 | 1 | 110003 | 5-2,C TOWN,T CITY,I PREFECTURE | FILE 110003 | (12-3) |
| 1 | 1 | 110004 | 4-2,B TOWN,T CITY,I PREFECTURE | FILE 110004 | (12-4) |
| 1 | 1 | 110005 | 4-1,C TOWN,T CITY,I PREFECTURE | FILE 110005 | (12-5) |
| 1 | 1 | 110006 | 2-4,A TOWN,T CITY,I PREFECTURE | FILE 110006 | (12-6) |
| 1 | 1 | 110007 | 1-2,B TOWN,T CITY,I PREFECTURE | FILE 110007 | (12-7) |
| 1 | 1 | 110008 | 5-3,B TOWN,T CITY,I PREFECTURE | FILE 110008 | (12-8) |
| 1 | 1 | 110009 | 3-3,A TOWN,T CITY,I PREFECTURE | FILE 110009 | (12-9) |
| 1 | 1 | 110010 | 2-3,A TOWN,T CITY,I PREFECTURE | FILE 110010 | (12-10) |

FIG.13

| DEVICE NO. | ARTICLE NO. | IDENTIFICATION NO. | SORTING INFORMATION | IMAGE | (LINE NO.) |
|---|---|---|---|---|---|
| 2 | 2 | 220001 | 2-1, A TOWN, T CITY, I PREFECTURE | FILE 220001 | (13-1) |
| 2 | 2 | 220002 | 5-4, B TOWN, T CITY, I PREFECTURE | FILE 220002 | (13-2) |
| 2 | 2 | 220003 | 4-1, C TOWN, T CITY, I PREFECTURE | FILE 220003 | (13-3) |
| 2 | 2 | 220004 | 1-1, B TOWN, T CITY, I PREFECTURE | FILE 220004 | (13-4) |
| 2 | 2 | 220005 | 2-2, C TOWN, T CITY, I PREFECTURE | FILE 220005 | (13-5) |

FIG.14

| DEVICE NO. | ARTICLE NO. | IDENTIFICATION NO. | SORTING INFORMATION | IMAGE | (LINE NO.) |
|---|---|---|---|---|---|
| 3 | 3 | 330001 | 4-1, C TOWN, T CITY, I PREFECTURE | FILE 330001 | (14-1) |
| 3 | 3 | 330002 | 3-5, B TOWN, T CITY, I PREFECTURE | FILE 330002 | (14-2) |

FIG.15

| DEVICE NO. | ARTICLE NO. | IDENTIFICATION NO. | SORTING INFORMATION | IMAGE | (LINE NO.) |
|---|---|---|---|---|---|
| 4 | 1 | 410001 | 5-1, B TOWN, T CITY, I PREFECTURE | FILE 410001 | (15-1) |
| 4 | 1 | 410002 | 2-5, A TOWN, T CITY, I PREFECTURE | FILE 410002 | (15-2) |
| 4 | 1 | 410003 | 4-1, C TOWN, T CITY, I PREFECTURE | FILE 410003 | (15-3) |

FIG.16

| DEVICE NO. | ARTICLE NO. | IDENTIFICATION NO. | SORTING INFORMATION | IMAGE | (LINE NO.) |
|---|---|---|---|---|---|
| 1 | 1 | 110001 | 3-1,A TOWN,T CITY,I PREFECTURE | FILE 110001 | (16-1) |
| 1 | 1 | 110002 | 1-5,B TOWN,T CITY,I PREFECTURE | FILE 110002 | (16-2) |
| 1 | 1 | 110003 | 5-2,C TOWN,T CITY,I PREFECTURE | FILE 110003 | (16-3) |
| 1 | 1 | 110004 | 4-2,B TOWN,T CITY,I PREFECTURE | FILE 110004 | (16-4) |
| 1 | 1 | 110005 | 4-1,C TOWN,T CITY,I PREFECTURE | FILE 110005 | (16-5) |
| 1 | 1 | 110006 | 2-4,A TOWN,T CITY,I PREFECTURE | FILE 110006 | (16-6) |
| 1 | 1 | 110007 | 1-2,B TOWN,T CITY,I PREFECTURE | FILE 110007 | (16-7) |
| 1 | 1 | 110008 | 5-3,B TOWN,T CITY,I PREFECTURE | FILE 110008 | (16-8) |
| 1 | 1 | 110009 | 3-3,A TOWN,T CITY,I PREFECTURE | FILE 110009 | (16-9) |
| 1 | 1 | 110010 | 2-3,A TOWN,T CITY,I PREFECTURE | FILE 110010 | (16-10) |
| 2 | 2 | 220001 | 2-1,A TOWN,T CITY,I PREFECTURE | FILE 220001 | (16-11) |
| 2 | 2 | 220002 | 5-4,B TOWN,T CITY,I PREFECTURE | FILE 220002 | (16-12) |
| 2 | 2 | 220003 | 4-1,C TOWN,T CITY,I PREFECTURE | FILE 220003 | (16-13) |
| 2 | 2 | 220004 | 1-1,B TOWN,T CITY,I PREFECTURE | FILE 220004 | (16-14) |
| 2 | 2 | 220005 | 2-2,C TOWN,T CITY,I PREFECTURE | FILE 220005 | (16-15) |
| 3 | 3 | 330001 | 4-1,C TOWN,T CITY,I PREFECTURE | FILE 330001 | (16-16) |
| 3 | 3 | 330002 | 3-5,B TOWN,T CITY,I PREFECTURE | FILE 330002 | (16-17) |
| 4 | 1 | 410001 | 5-1,B TOWN,T CITY,I PREFECTURE | FILE 410001 | (16-18) |
| 4 | 1 | 410002 | 2-5,A TOWN,T CITY,I PREFECTURE | FILE 410002 | (16-19) |
| 4 | 1 | 410003 | 4-1,C TOWN,T CITY,I PREFECTURE | FILE 410003 | (16-20) |

FIG.17

| SORTING INFORMATION | REFERENCE DELIVERY NO. | (LINE NO.) |
|---|---|---|
| 1-1,A TOWN,T CITY,I PREFECTURE | 0001 | (17-1) |
| 1-2,A TOWN,T CITY,I PREFECTURE | 0002 | (17-2) |
| 1-3,A TOWN,T CITY,I PREFECTURE | 0003 | (17-3) |
| 1-4,A TOWN,T CITY,I PREFECTURE | 0004 | (17-4) |
| 1-5,A TOWN,T CITY,I PREFECTURE | 0005 | (17-5) |
| 2-1,A TOWN,T CITY,I PREFECTURE | 0006 | (17-6) |
| 2-2,A TOWN,T CITY,I PREFECTURE | 0007 | (17-7) |
| 2-3,A TOWN,T CITY,I PREFECTURE | 0008 | (17-8) |
| 2-4,A TOWN,T CITY,I PREFECTURE | 0009 | (17-9) |
| 2-5,A TOWN,T CITY,I PREFECTURE | 0010 | (17-10) |
| 3-1,A TOWN,T CITY,I PREFECTURE | 0011 | (17-11) |
| 3-2,A TOWN,T CITY,I PREFECTURE | 0012 | (17-12) |
| · · · · · · | · · · | (17-13) |
| 1-1,B TOWN,T CITY,I PREFECTURE | 0101 | (17-14) |
| 1-2,B TOWN,T CITY,I PREFECTURE | 0102 | (17-15) |
| 1-3,B TOWN,T CITY,I PREFECTURE | 0103 | (17-16) |
| · · · · · · | · · · | (17-17) |
| 1-1,C TOWN,T CITY,I PREFECTURE | 0201 | (17-18) |
| 1-2,C TOWN,T CITY,I PREFECTURE | 0202 | (17-19) |
| 1-3,C TOWN,T CITY,I PREFECTURE | 0203 | (17-20) |
| · · · · · · | · · · | (17-21) |

FIG.19

| REFERENCE DELIVERY NO. | DEVICE NO. | ARTICLE NO. | IDENTIFICATION NO. | SORTING INFORMATION | IMAGE | (LINE NO.) |
|---|---|---|---|---|---|---|
| 0011 | 1 | 1 | 110001 | 3-1,A TOWN,T CITY,I PREFECTURE | FILE 110001 | (19-1) |
| 0105 | 1 | 1 | 110002 | 1-5,B TOWN,T CITY,I PREFECTURE | FILE 110002 | (19-2) |
| 0222 | 1 | 1 | 110003 | 5-2,C TOWN,T CITY,I PREFECTURE | FILE 110003 | (19-3) |
| 0117 | 1 | 1 | 110004 | 4-2,B TOWN,T CITY,I PREFECTURE | FILE 110004 | (19-4) |
| 0216 | 1 | 1 | 110005 | 4-1,C TOWN,T CITY,I PREFECTURE | FILE 110005 | (19-5) |
| 0009 | 1 | 1 | 110006 | 2-4,A TOWN,T CITY,I PREFECTURE | FILE 110006 | (19-6) |
| 0102 | 1 | 1 | 110007 | 1-2,B TOWN,T CITY,I PREFECTURE | FILE 110007 | (19-7) |
| 0123 | 1 | 1 | 110008 | 5-3,B TOWN,T CITY,I PREFECTURE | FILE 110008 | (19-8) |
| 0013 | 1 | 1 | 110009 | 3-3,A TOWN,T CITY,I PREFECTURE | FILE 110009 | (19-9) |
| 0008 | 1 | 1 | 110010 | 2-3,A TOWN,T CITY,I PREFECTURE | FILE 110010 | (19-10) |
| 0006 | 2 | 2 | 220001 | 2-1,A TOWN,T CITY,I PREFECTURE | FILE 220001 | (19-11) |
| 0124 | 2 | 2 | 220002 | 5-4,B TOWN,T CITY,I PREFECTURE | FILE 220002 | (19-12) |
| 0216 | 2 | 2 | 220003 | 4-1,C TOWN,T CITY,I PREFECTURE | FILE 220003 | (19-13) |
| 0101 | 2 | 2 | 220004 | 1-1,B TOWN,T CITY,I PREFECTURE | FILE 220004 | (19-14) |
| 0207 | 2 | 2 | 220005 | 2-2,C TOWN,T CITY,I PREFECTURE | FILE 220005 | (19-15) |
| 0216 | 3 | 3 | 330001 | 4-1,C TOWN,T CITY,I PREFECTURE | FILE 330001 | (19-16) |
| 0115 | 3 | 3 | 330002 | 3-5,B TOWN,T CITY,I PREFECTURE | FILE 330002 | (19-17) |
| 0121 | 4 | 1 | 410001 | 5-1,B TOWN,T CITY,I PREFECTURE | FILE 410001 | (19-18) |
| 0010 | 4 | 1 | 410002 | 2-5,A TOWN,T CITY,I PREFECTURE | FILE 410002 | (19-19) |
| 0216 | 4 | 1 | 410003 | 4-1,C TOWN,T CITY,I PREFECTURE | FILE 410003 | (19-20) |

FIG.20

| REFERENCE DELIVERY NO. | DEVICE NO. | ARTICLE NO. | IDENTIFICATION NO. | SORTING INFORMATION | IMAGE | (LINE NO.) |
|---|---|---|---|---|---|---|
| 0006 | 2 | 2 | 220001 | 2-1,A TOWN,T CITY,I PREFECTURE | FILE 220001 | (20-1) |
| 0008 | 1 | 1 | 110010 | 2-3,A TOWN,T CITY,I PREFECTURE | FILE 110010 | (20-2) |
| 0009 | 1 | 1 | 110006 | 2-4,A TOWN,T CITY,I PREFECTURE | FILE 110006 | (20-3) |
| 0010 | 4 | 1 | 410002 | 2-5,A TOWN,T CITY,I PREFECTURE | FILE 410002 | (20-4) |
| 0011 | 1 | 1 | 110001 | 3-1,A TOWN,T CITY,I PREFECTURE | FILE 110001 | (20-5) |
| 0013 | 1 | 1 | 110009 | 3-3,A TOWN,T CITY,I PREFECTURE | FILE 110009 | (20-6) |
| 0101 | 2 | 2 | 220004 | 1-1,B TOWN,T CITY,I PREFECTURE | FILE 220004 | (20-7) |
| 0102 | 1 | 1 | 110007 | 1-2,B TOWN,T CITY,I PREFECTURE | FILE 110007 | (20-8) |
| 0105 | 1 | 1 | 110002 | 1-5,B TOWN,T CITY,I PREFECTURE | FILE 110002 | (20-9) |
| 0115 | 3 | 3 | 330002 | 3-5,B TOWN,T CITY,I PREFECTURE | FILE 330002 | (20-10) |
| 0117 | 1 | 1 | 110004 | 4-2,B TOWN,T CITY,I PREFECTURE | FILE 110004 | (20-11) |
| 0121 | 4 | 1 | 410001 | 5-1,B TOWN,T CITY,I PREFECTURE | FILE 410001 | (20-12) |
| 0123 | 1 | 1 | 110008 | 5-3,B TOWN,T CITY,I PREFECTURE | FILE 110008 | (20-13) |
| 0124 | 2 | 2 | 220002 | 5-4,B TOWN,T CITY,I PREFECTURE | FILE 220002 | (20-14) |
| 0207 | 2 | 2 | 220005 | 2-2,C TOWN,T CITY,I PREFECTURE | FILE 220005 | (20-15) |
| 0216 | 1 | 1 | 110005 | 4-1,C TOWN,T CITY,I PREFECTURE | FILE 110005 | (20-16) |
| 0216 | 2 | 2 | 220003 | 4-1,C TOWN,T CITY,I PREFECTURE | FILE 220003 | (20-17) |
| 0216 | 3 | 3 | 330001 | 4-1,C TOWN,T CITY,I PREFECTURE | FILE 330001 | (20-18) |
| 0216 | 4 | 1 | 410003 | 4-1,C TOWN,T CITY,I PREFECTURE | FILE 410003 | (20-19) |
| 0222 | 1 | 1 | 110003 | 5-2,C TOWN,T CITY,I PREFECTURE | FILE 110003 | (20-20) |

FIG.21

| DELIVERY NO. | DEVICE NO. | ARTICLE NO. | IDENTIFICATION NO. | SORTING INFORMATION | IMAGE | DELIVERY CONDITION | (LINE NO.) |
|---|---|---|---|---|---|---|---|
| 1 | 2 | 2 | 220001 | 2-1, A TOWN, T CITY, I PREFECTURE | FILE 220001 | ARRANGEMENT NOT FINISHED | (21-1) |
| 2 | 1 | 1 | 110010 | 2-3, A TOWN, T CITY, I PREFECTURE | FILE 110010 | ARRANGEMENT NOT FINISHED | (21-2) |
| 3 | 1 | 1 | 110006 | 2-4, A TOWN, T CITY, I PREFECTURE | FILE 110006 | ARRANGEMENT NOT FINISHED | (21-3) |
| 4 | 4 | 1 | 410002 | 2-5, A TOWN, T CITY, I PREFECTURE | FILE 410002 | ARRANGEMENT NOT FINISHED | (21-4) |
| 5 | 1 | 1 | 110001 | 3-1, A TOWN, T CITY, I PREFECTURE | FILE 110001 | ARRANGEMENT NOT FINISHED | (21-5) |
| 6 | 1 | 1 | 110009 | 3-3, A TOWN, T CITY, I PREFECTURE | FILE 110009 | ARRANGEMENT NOT FINISHED | (21-6) |
| 7 | 2 | 2 | 220004 | 1-1, B TOWN, T CITY, I PREFECTURE | FILE 220004 | ARRANGEMENT NOT FINISHED | (21-7) |
| 8 | 1 | 1 | 110007 | 1-2, B TOWN, T CITY, I PREFECTURE | FILE 110007 | ARRANGEMENT NOT FINISHED | (21-8) |
| 9 | 1 | 1 | 110002 | 1-5, B TOWN, T CITY, I PREFECTURE | FILE 110002 | ARRANGEMENT NOT FINISHED | (21-9) |
| 10 | 3 | 3 | 330002 | 3-5, B TOWN, T CITY, I PREFECTURE | FILE 330002 | ARRANGEMENT NOT FINISHED | (21-10) |
| 11 | 1 | 1 | 110004 | 4-2, B TOWN, T CITY, I PREFECTURE | FILE 110004 | ARRANGEMENT NOT FINISHED | (21-11) |
| 12 | 4 | 1 | 410001 | 5-1, B TOWN, T CITY, I PREFECTURE | FILE 410001 | ARRANGEMENT NOT FINISHED | (21-12) |
| 13 | 1 | 1 | 110008 | 5-3, B TOWN, T CITY, I PREFECTURE | FILE 110008 | ARRANGEMENT NOT FINISHED | (21-13) |
| 14 | 2 | 2 | 220002 | 5-4, B TOWN, T CITY, I PREFECTURE | FILE 220002 | ARRANGEMENT NOT FINISHED | (21-14) |
| 15 | 2 | 2 | 220005 | 2-2, C TOWN, T CITY, I PREFECTURE | FILE 220005 | ARRANGEMENT NOT FINISHED | (21-15) |
| 16 | 1 | 1 | 110005 | 4-1, C TOWN, T CITY, I PREFECTURE | FILE 110005 | ARRANGEMENT NOT FINISHED | (21-16) |
| 17 | 2 | 2 | 220003 | 4-1, C TOWN, T CITY, I PREFECTURE | FILE 220003 | ARRANGEMENT NOT FINISHED | (21-17) |
| 18 | 3 | 3 | 330001 | 4-1, C TOWN, T CITY, I PREFECTURE | FILE 330001 | ARRANGEMENT NOT FINISHED | (21-18) |
| 19 | 4 | 1 | 410003 | 4-1, C TOWN, T CITY, I PREFECTURE | FILE 410003 | ARRANGEMENT NOT FINISHED | (21-19) |
| 20 | 1 | 1 | 110003 | 5-2, C TOWN, T CITY, I PREFECTURE | FILE 110003 | ARRANGEMENT NOT FINISHED | (21-20) |

FIG.22

| DELIVERY NO. | DEVICE NO. | ARTICLE NO. | IDENTIFICATION NO. | SORTING INFORMATION | IMAGE | DELIVERY CONDITION | (LINE NO.) |
|---|---|---|---|---|---|---|---|
| 2 | 1 | 1 | 110010 | 2-3, A TOWN, T CITY, I PREFECTURE | FILE 110010 | ARRANGEMENT FINISHED | (21-2) |
| 3 | 1 | 1 | 110006 | 2-4, A TOWN, T CITY, I PREFECTURE | FILE 110006 | ARRANGEMENT FINISHED | (21-3) |
| 4 | 4 | 1 | 410002 | 2-5, A TOWN, T CITY, I PREFECTURE | FILE 410002 | ARRANGEMENT FINISHED | (21-4) |
| 5 | 1 | 1 | 110001 | 3-1, A TOWN, T CITY, I PREFECTURE | FILE 110001 | ARRANGEMENT FINISHED | (21-5) |
| 6 | 1 | 1 | 110009 | 3-3, A TOWN, T CITY, I PREFECTURE | FILE 110009 | ARRANGEMENT FINISHED | (21-6) |
| 8 | 1 | 1 | 110007 | 1-2, B TOWN, T CITY, I PREFECTURE | FILE 110007 | ARRANGEMENT NOT FINISHED | (21-8) |
| 9 | 1 | 1 | 110002 | 1-5, B TOWN, T CITY, I PREFECTURE | FILE 110002 | ARRANGEMENT FINISHED | (21-9) |
| 11 | 1 | 1 | 110004 | 4-2, B TOWN, T CITY, I PREFECTURE | FILE 110004 | ARRANGEMENT FINISHED | (21-11) |
| 12 | 4 | 1 | 410001 | 5-1, B TOWN, T CITY, I PREFECTURE | FILE 410001 | ARRANGEMENT FINISHED | (21-12) |
| 13 | 1 | 1 | 110008 | 5-3, B TOWN, T CITY, I PREFECTURE | FILE 110008 | ARRANGEMENT FINISHED | (21-13) |
| 16 | 1 | 1 | 110005 | 4-1, C TOWN, T CITY, I PREFECTURE | FILE 110005 | ARRANGEMENT NOT FINISHED | (21-16) |
| 19 | 4 | 1 | 410003 | 4-1, C TOWN, T CITY, I PREFECTURE | FILE 410003 | ARRANGEMENT FINISHED | (21-19) |
| 20 | 1 | 1 | 110003 | 5-2, C TOWN, T CITY, I PREFECTURE | FILE 110003 | ARRANGEMENT FINISHED | (21-20) |

ARTICLE DELIVERY SYSTEM

BACKGROUND OF THE INVENTION

This invention relates to an article delivery system for arranging paper sheets and box-like or cubic articles in the order of delivery in accordance with sorting information provided thereon, or for providing the delivery order so as to help the delivery operation.

One example of apparatuses for handling a plurality of kinds of articles each having sorting information and for arranging these articles in the order of delivery is a paper sheet and the like delivery route structuring apparatus disclosed in JP-A-7-185471. This paper sheet and the like delivery route structuring apparatus comprises a first memory portion for storing delivery points of first paper sheets and the like, a second memory portion for storing delivery points of second paper sheets and the like, and identification unit inserting means for inserting identification units, corresponding to the respective second paper sheets and the like, in relevant positions at the arranged first paper sheets and the like.

In the actual delivering operation, a plurality of kinds of articles are delivered at the same time. For example, in a mail processing service, regular-shape letters, irregular-shape letters and special letters (such as registered mail) are brought out at the same time, and are delivered. In a delivering operation, such as a door-to-door courier service by a courier service company, parcels and letters are delivered at the same time.

However, if an amount of articles, which one sorting device can handle, is limited, or there are limitations on the delivery management, the articles cannot be physically arranged in one delivery order. Therefore, the delivery order for each kind of articles must be found, and in the prior art technique, this is not taken into consideration.

In the prior art technique, identification units for the other articles are inserted in main articles. However, when the proportion of the other articles is high, the number of the identification units, similar in shape to the main article, is increased, and this is not desirable because the amount of articles increases.

And besides, the arrangement of the articles cannot be effected until all of the articles are collected. The other hand, when the arrangement of the articles is started after all of the article are collected, a long time is required, and this results in a problem that the delivery is delayed. Therefore, it has been required that each time the articles are collected in a certain amount, the arrangement should be effected. However, in this case, a plurality of arrangement rows of articles are formed, and the burden on the operator increases at the time of delivery.

Furthermore, in the prior art technique, that kind of articles, larger in amount than the other articles, are arranged, and the order of delivery of the other articles is determined on the basis of the larger amount articles. However, the delivery order, formed on the basis of one kind of articles, is often different from the delivery order formed on the basis of all of the articles, and the proper delivery order could not always be obtained.

SUMMARY OF THE INVENTION

Accordingly, in an apparatus of the present invention, in order to solve the above problems, an object is to unify and arrange a plurality of kinds of articles, or to unify and arrange the delivery points, to which the plurality of kinds of articles are to be delivered, respectively, to provide to the operator.

To achieve the above object, the present invention provides an article delivery system for arranging articles in accordance with sorting information, provided thereon, so as to help the delivery of the articles, comprising:

a plurality of article information procuring means for respectively procuring article information each containing at least the sorting information and kind information corresponding to the article; and delivery order forming means for arranging the article information in the order of delivery in accordance with the sorting information in the article information procured by the article information procuring means, and for transmitting the arranged article information in accordance with the arranging processing of the articles.

With this construction, it becomes possible to unify and arrange the plurality of kinds of articles.

When actually arranging the articles in the order of delivery, the arranged article information, corresponding to each kind of articles to be arranged, are transmitted, and in the arranging operation, the arrangement can be effected, taking into consideration the order of delivery of all the articles to be delivered.

To achieve the object of the invention, there is provided an article delivery system for arranging articles in accordance with sorting information, provided thereon, so as to help the delivery of the articles, comprising:

a plurality of article information procuring means for respectively procuring article information each containing at least the sorting information and kind information corresponding to the article;

delivery order forming means which receives the article information from the article information procuring means, and arranges the article information, each containing at least the sorting information, in the order of delivery, and transmits the arranged article information; and order indicating means for indicating the arrangement order or the delivery order formed by the delivery order forming means.

With this construction, it becomes possible to unify the delivery points, to which the plurality of kinds of articles are to be delivered, respectively, and to provide this information to the operator.

To achieve the object of the invention, in the article delivery system of the invention, at least one of the plurality of article information procuring means is provided, and an article sorting device is provided which sorts the articles in accordance with the sorting information, procured by sorting information procuring means and the article arrangement order formed by the deliver order forming means.

In the article delivery system of the invention, at least one of the plurality of article information procuring means includes identification unit producing means for producing an identification unit, containing identification information corresponding to the article, for the article, and there is provided order indicating means having identification unit confirming means capable of confirming the identification information from the identification unit, and therefore the deliver order can be indicated in accordance with the identification information.

In the invention, at least one of the plurality of article information procuring means comprises means for procuring the form of the article, and there is provided order indicating means for indicating the delivery order, formed by the delivery order forming means, and for displaying form information of the article. Therefore, the order of delivery of the articles, as well as the articles, can be easily identified. The article form information comprises information enabling the easy identification of the articles, such as the appearance of letters, the appearance of parcels, and characteristic portions thereof.

Preferably, the article information procuring means of the invention includes a reader for reading characters and bar code.

Preferably, the order indicating means of the invention is connected to positioning means for measuring the position where the order indicating means exists and displays the position upon measurement.

The delivery order forming means of the invention transmits the arranged article information every arrangements of the articles. Therefore, the articles, each having the respective sorting information, can be arranged in the delivery order in a unified manner regardless of the timing of having obtained the sorting information. If the articles of the same kinds are arranged in a plurality of rows when these articles are arranged in the delivery order, any one of these rows is indicated, and by doing so, the articles can be delivered along the optimum delivery path.

To achieve the object of the invention, an article information processing apparatus of the invention stores article information of articles procured by a plurality of article information procuring means which procure the article information each containing at least sorting information and kind information corresponding to the article, and arranges the article information in the order of delivery in accordance with the sorting information in the article information, and transmits the arranged article information in accordance with the arranging processing of the articles.

With this construction, the articles, each having the sorting information, can be arranged in the delivery order in a unified manner regardless of the kinds of articles. The sorting information of the articles are managed in such a manner that the kinds of articles, as well as the arrangement rows of the articles, are distinguished from each other, and by doing so, the order of delivery of all the articles to be delivered can be formed.

Still further advantages of the present invention will become apparent to those of ordinary skill in the art upon reading and understanding the following detailed description of the preferred and alternate embodiments.

BRIEF DESCRIPTION OF THE DRAWINGS

The invention will be described in conjunction with certain drawings which are for the purpose of illustrating the preferred and alternate embodiments of the invention only, and not for the purpose of limiting the same, and wherein:

FIG. 12 is a table showing one example of article information in a sorting device 1*a*;

FIG. 13 is a table showing one example of article information in a sorting device 1*b*;

FIG. 14 is a table showing one example of article information in a reader terminal 2;

FIG. 15 is a table showing one example of article information in an information terminal 3;

FIG. 16 is a table showing one example of article information in delivery order forming means 4;

FIG. 17 is a table showing one example of a reference order database;

FIG. 19 is a table showing one example of article information having reference delivery numbers added thereto, respectively;

FIG. 20 is a table showing one example of the article information arranged in accordance with the reference deliver numbers;

FIG. 21 a table showing one example of delivery information having consecutive delivery numbers added thereto, respectively;

FIG. 22 is a table showing one example of delivery information in the sorting device 1*a*;

DETAILED DESCRIPTION OF THE PREFERRED AND ALTERNATE EMBODIMENTS

Figure 1:
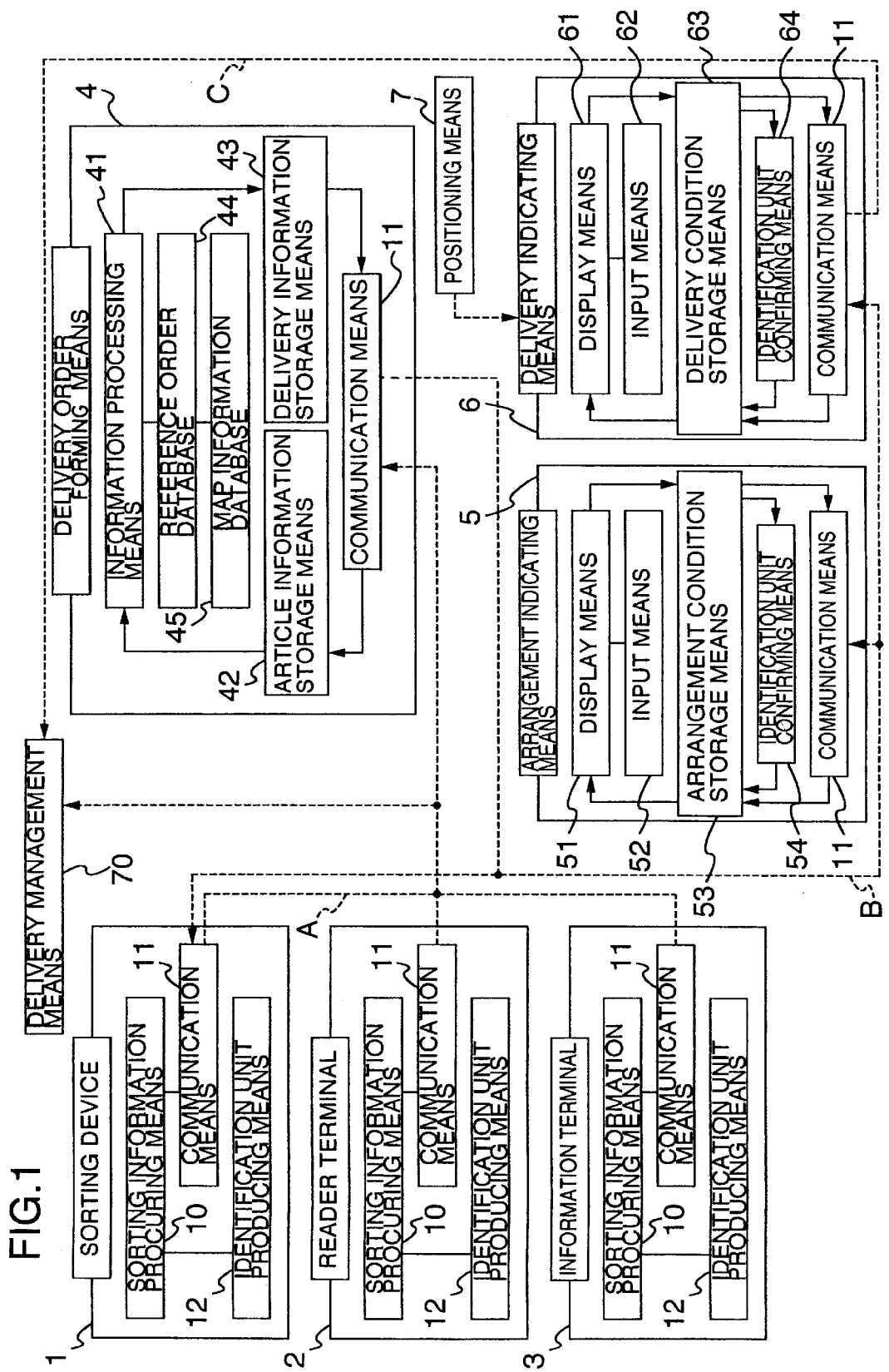
FIG. 1 is a schematic structural view showing one preferred embodiment of an article delivery system of the present invention.

FIG. 1 is a schematic structural view showing one preferred embodiment of an article delivery system of the present invention. In this system, various forms of articles (which are handled in different manners) are arranged in one row, or each kind of articles are arranged in one row, and then these articles are arranged in one delivery order. Therefore, this system can be applied when the articles to be delivered at the same time are processed in a plurality of arrangement paths, or a plurality of kinds of articles are arranged in a plurality of rows, respectively.

A sorting device 1 sorts articles, each having sorting information, into predetermined sorting sections. Examples thereof include a letter sorting device and a parcel sorting device (described later). A reader terminal 2 is a device to read the sorting information provided on the articles. Examples thereof include a scanner and a bar code reader. An information terminal 3 is a device to have function of transforming or recording intangible electronic information on an article such as medium to be readable thereafter, and also to discriminate a delivery point of the electronic information. The information terminal 3 is, for example, a computer, and examples of the medium include a printed material such as paper, and an electronic recording medium such as a floppy disk (FD), a compact disk (CD) and a nonvolatile memory (ROM) for recording information through magnetic, light reflectance or a condition of electrons. The number of each of the sorting device 1, the reader terminal 2 and the information terminal 3 may be plural.

Each of the sorting device 1, the reader terminal 2 and the information terminal 3 includes at least sorting information procuring means 10 for procuring the sorting information in order to identify the delivery point (destination). Examples of the sorting information includes address of the delivery point, identification information (postal number, name, telephone number and so on) corresponding to the delivery point, and identification number for each article.

Each of the sorting device 1, the reader terminal 2 and the information terminal 3 includes communication means 11 for transmitting the sorting information obtained by the sorting information procuring means 10. The communication means 11 gives, in addition to the sorting information, number of the device which has handled the article and number indicative of the kind of article and transmits them as article information A.

Also, hereinafter description will be given of an example in which each of the sorting device 1, the reader terminal 2 and the information terminal 3 includes identification unit producing means 12 for producing an identification unit which records the sorting information or identification information corresponding to the sorting information.

Delivery order forming means 4 is a device to form the delivery order on the basis of the sorting information read by the sorting device 1, the reader terminal 2 and the information terminal 3. Therefore, this means 4 includes at least information processing means 41, article information storage means 42, delivery information storage means 43 and communication means 11. The delivery order forming means 4 also includes one or both of a reference order database 44 (serving as a reference) and a map information database 45 in order to find the delivery order. In FIG. 1, although the article information storage means 42 and the delivery information storage means 43 are described separately from each other, the two may be combined into one storage means.

Arrangement indicating means 5 is a device to indicate the order of arrangement of articles to the operator, and this means 5 is, for example, a computer. The arrangement indicating means 5 includes at least display means 51, input means 52, arrangement condition storage means 53, and communication means 11. The arrangement indicating means 5 can further include identification unit confirming means 54 for confirming the identification unit applied to the article. Delivery indicating means 6 is a device to indicate the order of delivery of the articles to the operator, and this means 6 is, for example, a computer. The delivery indicating means 6 includes at least display means 61, input means 62, delivery condition storage means 63, and communication means 11. The delivery indicating means 6 can further includes identification unit confirming means 64 for confirming the identification unit applied to the article. The arrangement indicating means 5 and the delivery indicating means 6 can have the same construction, and therefore a common device may be switched to be used as the two means 5 and 6.

Positioning means 7 is means for procuring a place where the delivery indicating means 6 exists, and this means 7 is, for example, a GPS (global positioning system).

In the above article delivery system, the communication among the devices is effected through the communication means 11, and therefore it is not always necessary to locate these devices in adjacent relation to one another.

Details of the above devices and means will be described.

Figure 2:
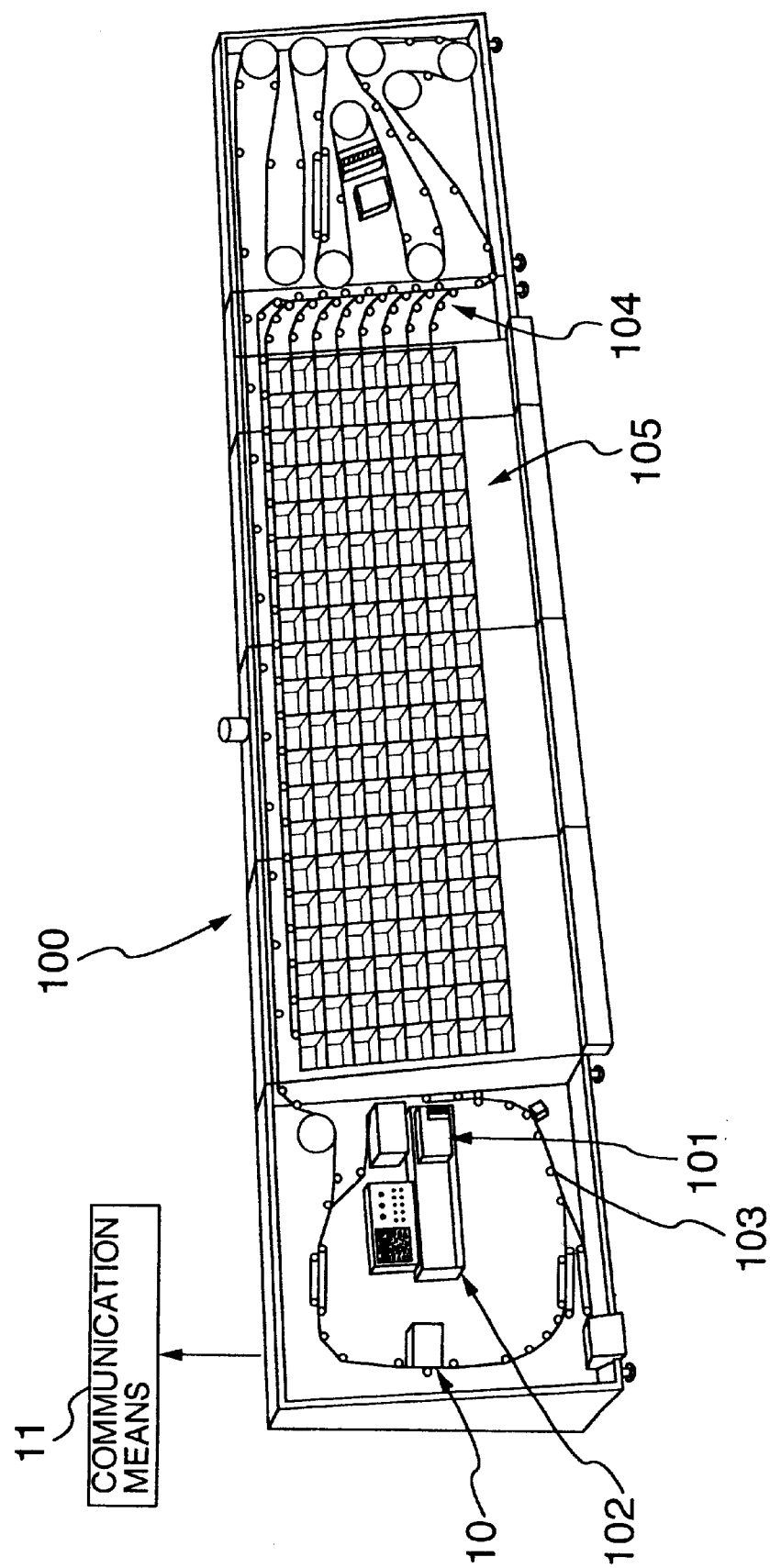
FIG. 2 is a schematic structural view of a letter sorting device.

FIG. 2 shows a letter sorting device 100 which is one example of the sorting device 1. The construction of the letter sorting device 100 will be briefly described. Articles 101 each having sorting information are, for example, letters each having an address written thereon. Supply means 102 sequentially supplies the letters 101 one by one. The supply means 102 comprises, for example, a perforated belt, and the air is drawn through the perforations so as to hold the letters 101 on the belt by suction. The belt is intermittently moved so as to supply the letters one by one.

Convey means 103 conveys the letters 101 fed from the supply means 102. The convey means 103 comprises, for example, a pair of opposed belts, and the letters 101 are held between the belts, and the belts are driven to convey the letters 101.

The sorting information procuring means 10 is provided adjacent to the convey means 103. The sorting information procuring means 10 is, for example, a CCD camera for picking up an image of an address surface of the letter 101 conveyed by the convey means 103, and the address is read by recognizing characters or a bar code on the address surface. Alternatively, if the sorting information is given on the letter only in the form of a bar code, a bar code pattern is procured (picked up) by laser beam emitting and receiving devices, thereby reading the address.

Sorter means 104 changes the conveying direction in accordance with the sorting information, procured by the sorting information procuring means 10, and feeds the letters 101 to stack sections of stack means 105 respectively corresponding to the sorting information. The sorter means 104 has, for example, a construction in which the position of a gate piece is changed by a solenoid. Each stack section of the stack means 105 has, for example, a box-like shape, and the letters 101 are stacked together in a direction of a thickness thereof.

Thus, the sorting information of each letters 101 is read by the sorting information procuring means 10, and the letters 101 are stacked or collected respectively in the corresponding stack sections of the stack means 105 in accordance with the sorting information, thereby classifying the letters 101 into the corresponding sections.

Figure 3:
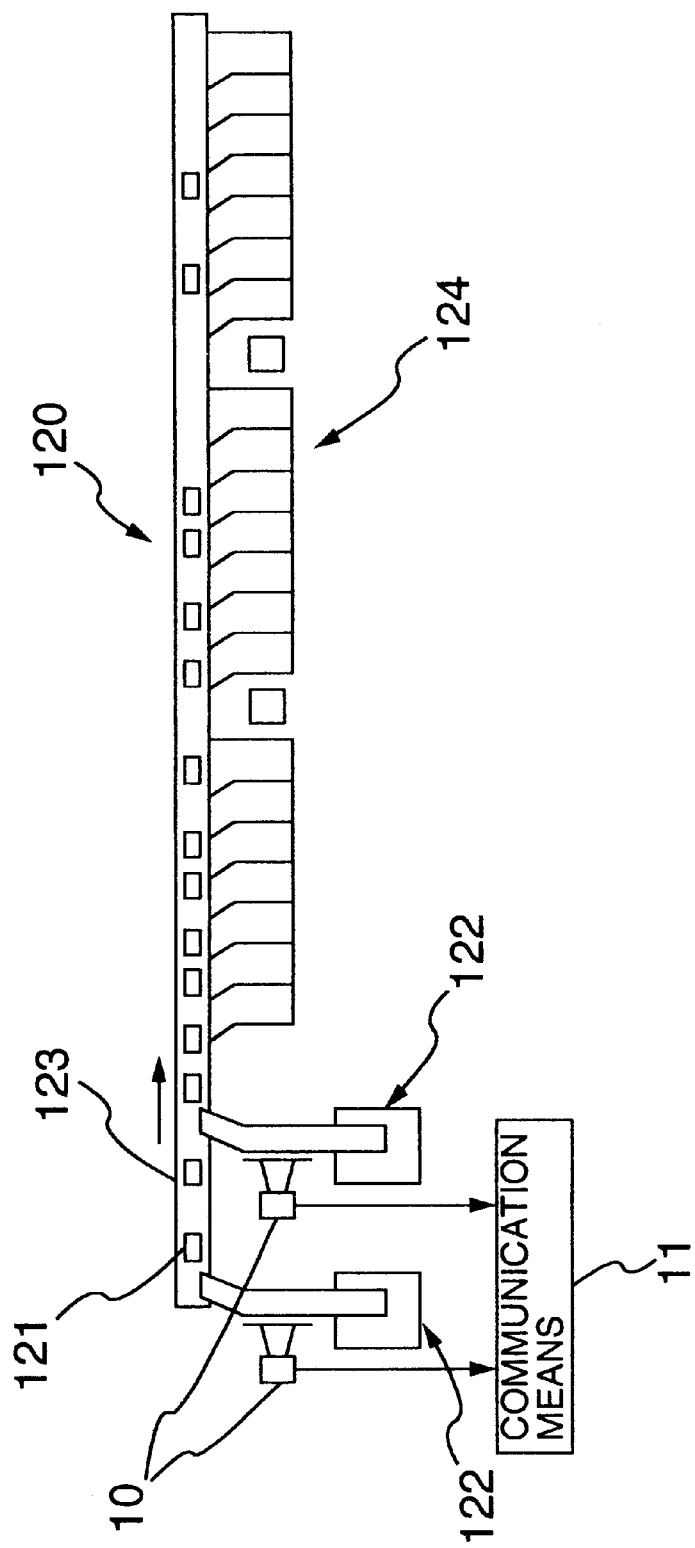
FIG. 3 is a schematic structural view of a parcel sorting device.

Another example of the sorting device 1 is a parcel sorting device 120 shown in FIG. 3. FIG. 3 is a schematic structural view for explaining the parcel sorting device 120. Parcels 121 each having sorting information are supplied into the parcel sorting device 120 through supply means 122. Each supply means 122 is, for example, a belt conveyor which can be intermittently driven. The parcels 121 supplied by the supply means 122 are transferred to convey means 123. The convey means 123 is a belt conveyor operating at a constant speed. If that area of the convey means 123, disposed adjacent to the supply means 122, is empty, the belt conveyor of the supply means 122 is driven to supply the parcel 121 onto the convey means 123. On the other hand, if there is no empty area on the convey means 123, or immediately after the parcel 121 is supplied to the convey means 123, the belt conveyor of the supply means 122 is stopped and is actuated so that the parcels 121 on the convey means 123 are conveyed at intervals more than predetermined intervals.

The sorting information procuring means 10 is provided adjacent to each supply means 122 or convey means 123. The sorting information procuring means 10 is, for example, a CCD camera for picking up an image of address on the parcel 121, and the address is read by recognizing characters of the address. If the sorting information is stored in a non-contact-type IC card, the sorting information procuring means 10 is means capable of communicating with such a non-contact-type IC card.

Stack means 124 is divided into a plurality of stack sections so that the parcels 121, conveyed by the convey means 123, can be stacked respectively in the corresponding stack sections in accordance with the sorting information. Referring to one example of the stack means 124, the convey means 123 is inclined in such a manner that that side of the convey means 123, disposed adjacent to the stack means 124, is disposed at a lower level. The stack means 124 has partitions (not shown), which can be opened and closed, provided at that side thereof disposed adjacent to the convey means 123, and the partitions are opened and closed in accordance with the sorting information read by the sorting information procuring means 10, thereby loading the parcels 121 respectively into the corresponding stack sections of the stack means 124.

Thus, the sorting information of the parcels 121 are read by the sorting information procuring means 10, and the parcels 121 are stacked respectively in the corresponding stack sections of the stack means 124 in accordance with the sorting information, thus classifying the parcels 121 into the corresponding sections.

As described above for the two examples, the sorting device 1 procures the sorting information such as the address on the articles, and sorts the articles into the corresponding sections.

Figure 4:
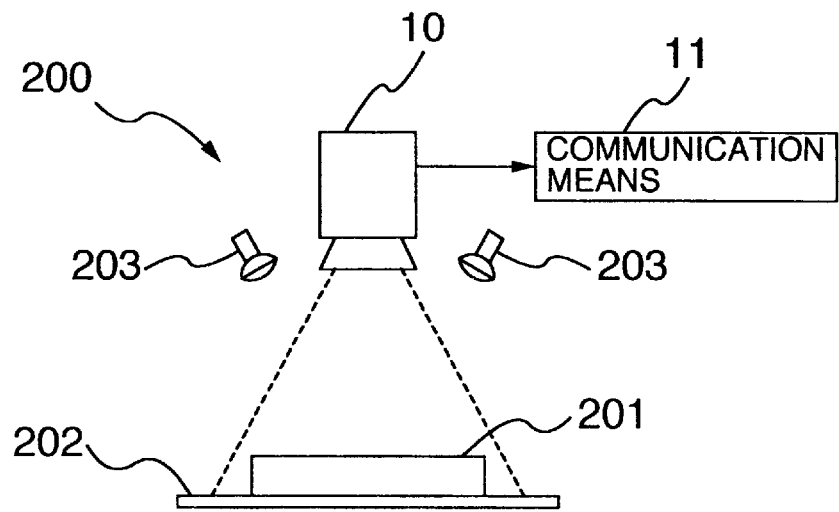
FIG. 4 is a schematic structural view of a scanner.
Figure 5:
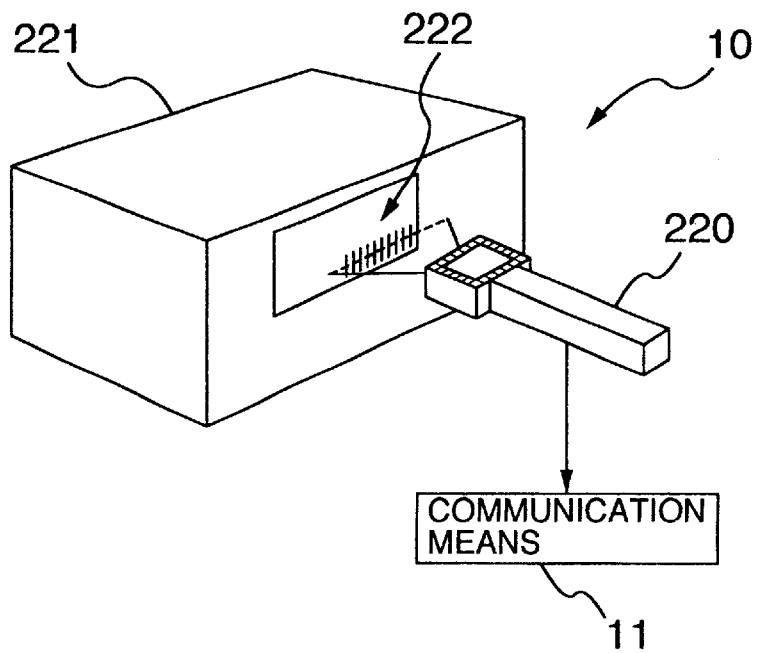
FIG. 5 is a view explanatory of another example of a reader terminal applied to the invention.

Next, examples of reader terminal 2 are shown in FIGS. 4 and 5. FIG. 4 is a schematic view to explain a scanner for procuring the sorting information of articles. The scanner 200 reads the sorting information of a special postal matter (e.g. a registered letter) 201 placed on a placing bed 202. The sorting information procuring means 10 is, for example, a CCD camera which picks up an image of the address on the special postal matter 201, placed on the placing bed 202, while illuminating this postal matter 201 by an illuminating device 203. The picked-up image is subjected to image processing, and the necessary information such as sorting information, is recognized from the image information, and is converted into electronic sorting information. The converted information is transmitted to the delivery order forming means 4 via the communication means 11. FIG. 5 is an explanatory view for explaining another example of reader terminal 2. As another example of the reader terminal 2, there is a bar code reader 220 shown in FIG. 5. The sorting information procuring means 10 comprises only the bar code reader 220, or comprises the bar code reader 220 and a device for converting bar code information.

An article 221 is, for example, a parcel having the sorting information, and a bar code 222, containing the sorting information, is provided on the parcel 221. The sorting information procuring means 10 reads the bar code 222, written on the parcel 221, by the bar code reader 220, if necessary to convert the read information, to procure the sorting information.

As described above for the two examples, the reader terminal 2 is means for procuring the sorting information such as the address on the article, but the processing, such as a sorting operation, is manually effected.

Figure 6:
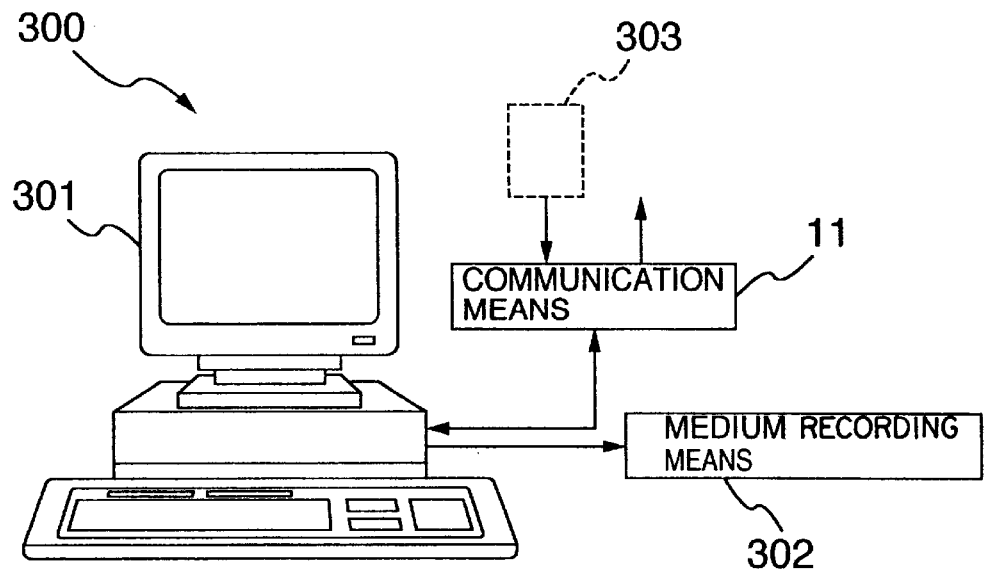
FIG. 6 is a schematic structural view of an information terminal applied to the invention.

An example of information terminal 3 is shown in FIG. 6. FIG. 6 is a view explanatory of one example of information terminal of the invention. One form of information terminal 3 is an information receiving device 300 shown in FIG. 6.

The information receiving device 300 comprises at least a computer 301 for effecting the predetermined processing for inputted information, medium storage means 302 for recording information, and the communication means 11. The information receiving device 300 receives electronic information 303 transmitted via the communication means 11. Here, the electronic information 303 is, for example, information transmitted via a network(e.g. electronic mail (E-mail)), or may be information fed from an electronic recording medium such as a FD.

Figure 7:
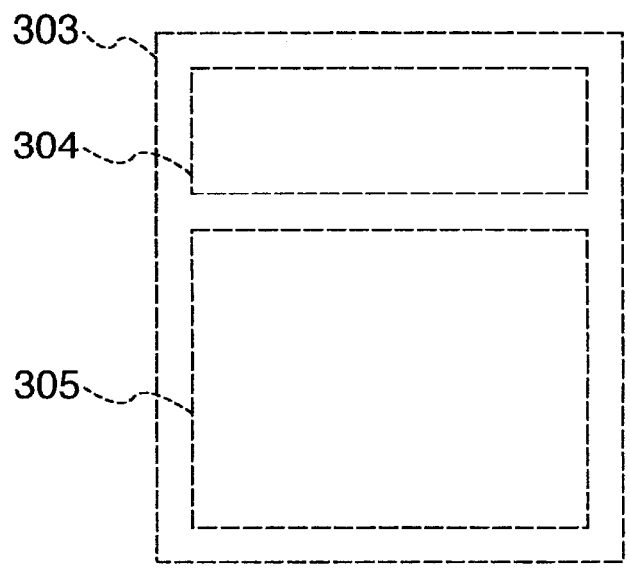
FIG. 7 is a conceptual view of electronic information applied to the invention.

FIG. 7 is a conceptual illustration showing the electronic information 303 to be handled here. The electronic information 303 includes at least a sorting information portion 304, containing sorting information such as addresses, and a content portion 305 containing information such as characters, pictures, sounds in electronic form. The information receiving device 300 procures the sorting information such as an address from the sorting information portion 304, and by the use of the medium recording means 302, to record the information in the content portion 305 only or in combination with the information in the sorting information portion 304 on the medium.

The medium recording means 302 is, for example, a printer for printing characters on paper, and alternatively a recording unit for a FD, a CD or the like may be used as this medium recording means 302.

Each of the sorting device 1, the reader terminal 2 and the information terminal 3 has the communication means 11, and transmits the sorting information, corresponding to the article, to the delivery order forming means 4. The communication means 11 is, for example, a wire or a wireless communication path such as a LAN, and alternatively the communication means 11 may be means for transmitting information via an electronic recording medium such as a FD.

As described above, although each of the sorting devices 1, the reader terminal 2 and the information terminal 3 reads the sorting information, and transmits it, it is preferred that they can transmit image information of the article in addition to the sorting information so that the articles can be confirmed when arranging and delivering the articles. Therefore, preferably, the sorting information procuring means 10 is a device capable of procuring not only the sorting information of the article but also factors such as the appearance of the article, the form of the address surface and the specification (e.g. the weight) of the article.

FIG. 12 is an illustration showing one example of article information A to be transmitted to the delivery order forming means 4 via the communication means 11. Referring to items of the article information A, the article information A contains the device numbers assigned respectively to the associated devices such as the sorting devices 1, the article numbers assigned respectively to the kinds (e.g. letter and parcel) of articles, the identification numbers assigned respectively to the articles, and the sorting information such as an address. In the case where the sorting information procuring means 10 is designed to procure the image of the article, image data (file no.) is also contained in the article information A. There may be used a method in which one of the device number and the article number, as well as one of the identification number and the sorting information, can be contained in the article information A if the corresponding relation between the two is specifically defined.

As described above, each of the sorting device 1, the reader terminal 2 and the information terminal 3 may include the identification unit producing means 12. The identification unit is a member in which the identification number assigned for each article and the sorting information such as an address are recorded thereon, and which is carried together with the article. Examples of the identification unit producing means 12 include means for attaching on the article a paper sheet having a bar code printed thereon or an IC card capable of radio-communicating information, and means for printing a bar code directly on the article.

Next, the delivery order forming means 4 will be described with reference to FIG. 1. The deliver order forming means 4 is means for forming the order of arrangement of the articles in accordance with the article information A fed from the sorting device and the like via the communication means 11. The article information A, fed via the communication means 11, is stored in the article information storage means 42. One example of data, stored in the article information storage means 42, is shown in FIG. 16. The article information A, fed from the sorting device 1, the reader terminal 2 and the information terminal 3 connected to the deliver order forming means 4, are stored in a mixed manner in the article information storage means 42.

The information processing means 41 is a processor, and here it includes a sort algorithm. As an example of the sort algorithm, generally a bubble sort method and a quick sort method are known, and either of them can be used here. The order of arrangement of the articles can be obtained from the information processing means 41, and more specifically delivery order numbers can be obtained from the reference order database 44 and the map information database 45.

One example of the reference order database 44 is shown in FIG. 17. At least the relation between the sorting information and reference delivery numbers, predetermining the delivery order, is stored in the reference order database 44. There may be used a method in which the delivery zone is divided into a plurality of sections, and a plurality of reference order databases 44 are used.

Figure 18:
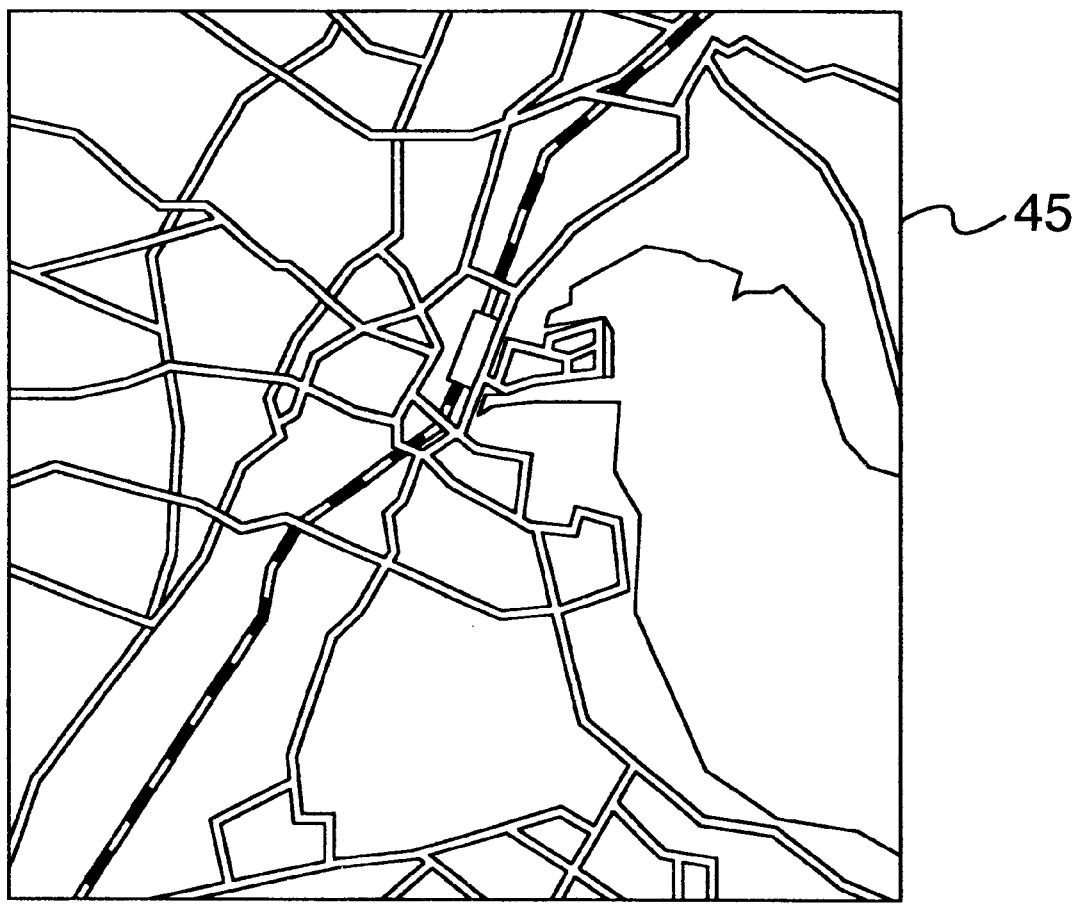
FIG. 18 is a view showing one example of a map information database.

On the other hand, geographical positions, corresponding to the sorting information, are stored in the map information database 45 as shown in FIG. 18. More specifically, various geographical coordinates data and data related to the distance between various coordinates points are stored in this database 45. In accordance with these geographical positions, a path along which the carrier (delivery man) can move through a plurality of delivery points in a shorter time is computed, and the reference delivery numbers are determined.

The reference delivery numbers can be determined by either of the reference order database 44 and the map information database 45, and therefore only one of the two may be used.

The information processing means 41 arranges the article information A in accordance with the thus obtained reference delivery numbers, using a sort algorithm. The article information, arranged by the information processing means 41, are stored as delivery information B in the delivery information storage means 43, and part or the whole of the delivery information B are transmitted via the communication means 11 according to the need. The delivery information B will be described more fully hereinafter.

Next, the arrangement indicating means 5, the delivery indicating means 6 and the positioning means 7 will be described. Each of the display means 51 and 61 is an information-displaying device such as a liquid crystal monitor. Preferably, each display means 51, 61 includes a device for generating sounds and vibrations. Each of the input means 52 and 62 is a device for inputting instructions of the operator, and examples of these input means include a key board, a pointing device, an input device operable by a voice or the like, and a touch panel integrated with the display means 51, 61. The arrangement condition storage means 53 stores the delivery information B and the condition of arrangement of the articles, and for example, the delivery information B is stored therein, with a condition "before arrangement" or a condition "after arrangement" added thereto.

On the other hand, the deliver condition storage means 63 is a device to store the delivery information B and the condition of delivery, and for example, it stores a condition "undelivered" and a condition "delivered".

If the identification units are added respectively to the arranged articles, each of the identification unit confirming means 54 and 64 confirms the identification unit by reading the contents thereof. Each identification unit confirming means 54, 64 is, for example, a bar code reader or a IC card reader. Preferably, the identification unit confirming means 54 and 64 are contained respectively in the arrangement indicating means 5 and the delivery indicating means 6, or are connectable respectively to these means 5 and 6.

The positioning means 7 is a device to measure the position where the delivery indicating means 6 exists, and the position measured by the positioning means 7 is displayed in the display means 61, and this information is used when effecting the delivery.

Delivery management means 70 is a device to manage the condition of delivery of the articles, and it manages, for example, the point (place), to which the article is delivered, and the article in the process of being delivered. Therefore, the delivery management means 70 receives the sorting information A of the articles and the delivery finish information C from the sorting device 1, the reader terminal 2, the information terminal 3 and the delivery indicating means 6.

If the number of articles to be arranged is relatively small, the arrangement indicating means 5 and the delivery indicating means 6, which are costly, are omitted in some cases. In this case, there may be used a method in which the delivery information B, formed by the delivery order forming means 4, are printed on paper or the like, and this is indicated to the operator. Therefore, if the amount of the articles is relatively small, the communication means 11 in the delivery order forming means 4 may serve also as means for printing the delivery information B.

Figure 8:
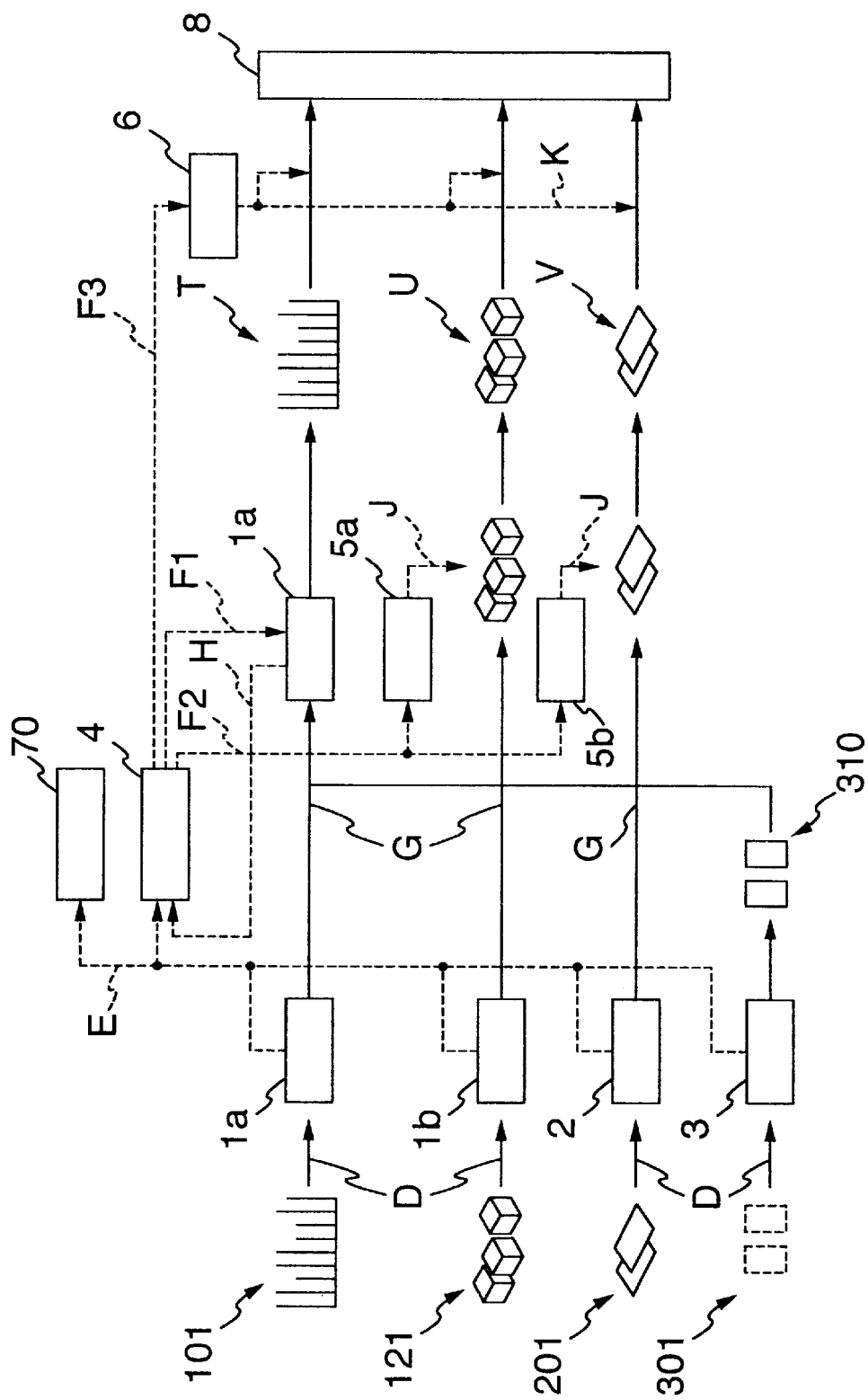
FIG. 8 is a schematic structural view of another embodiment of an article delivery system of the invention.
Figure 9:
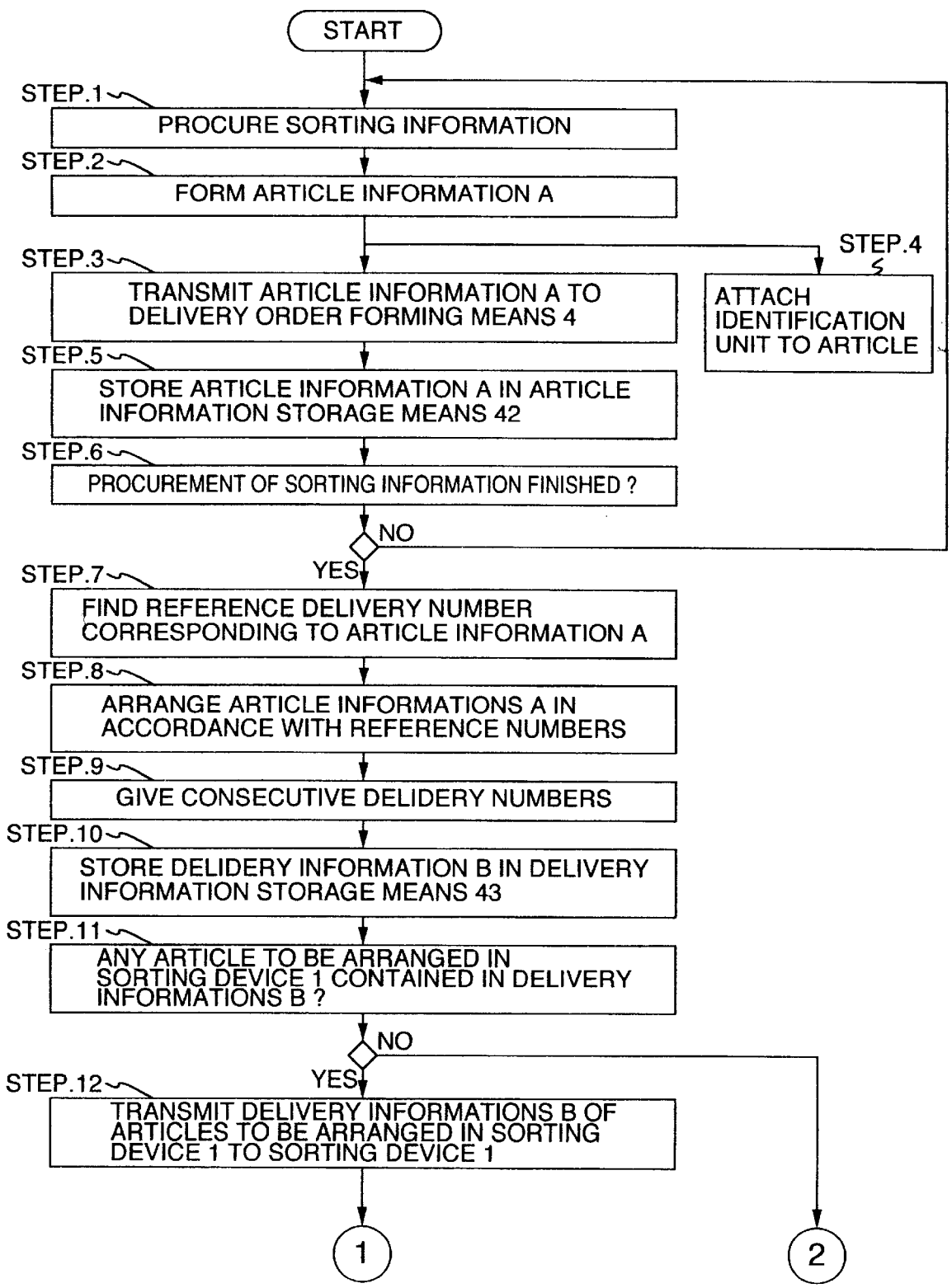
FIG. 9 is a flow chart showing the procedure of an article arranging process in the embodiment of FIG. 8.
Figure 10:
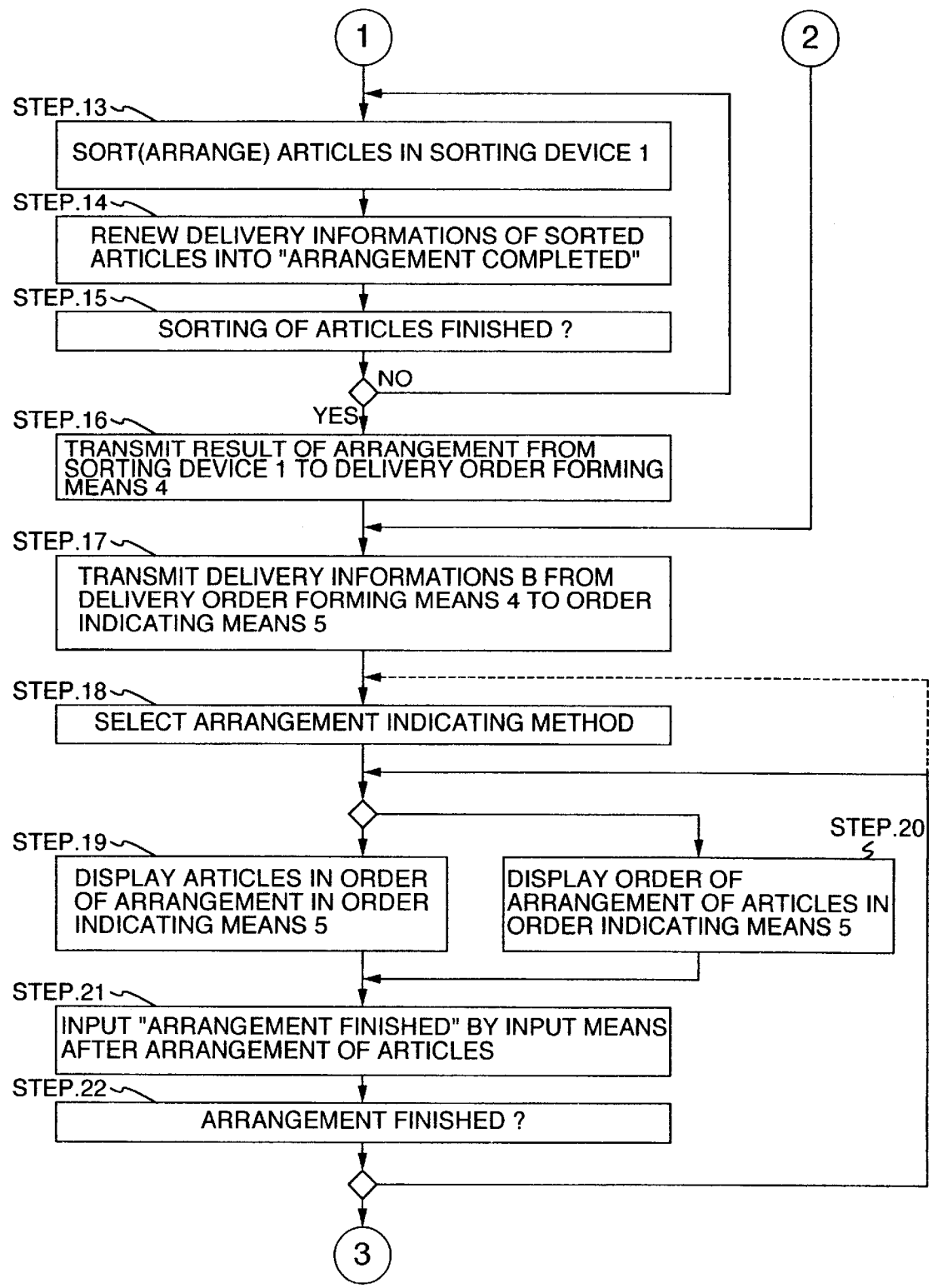
FIG. 10 is a flow chart continued from FIG. 9.
Figure 11:
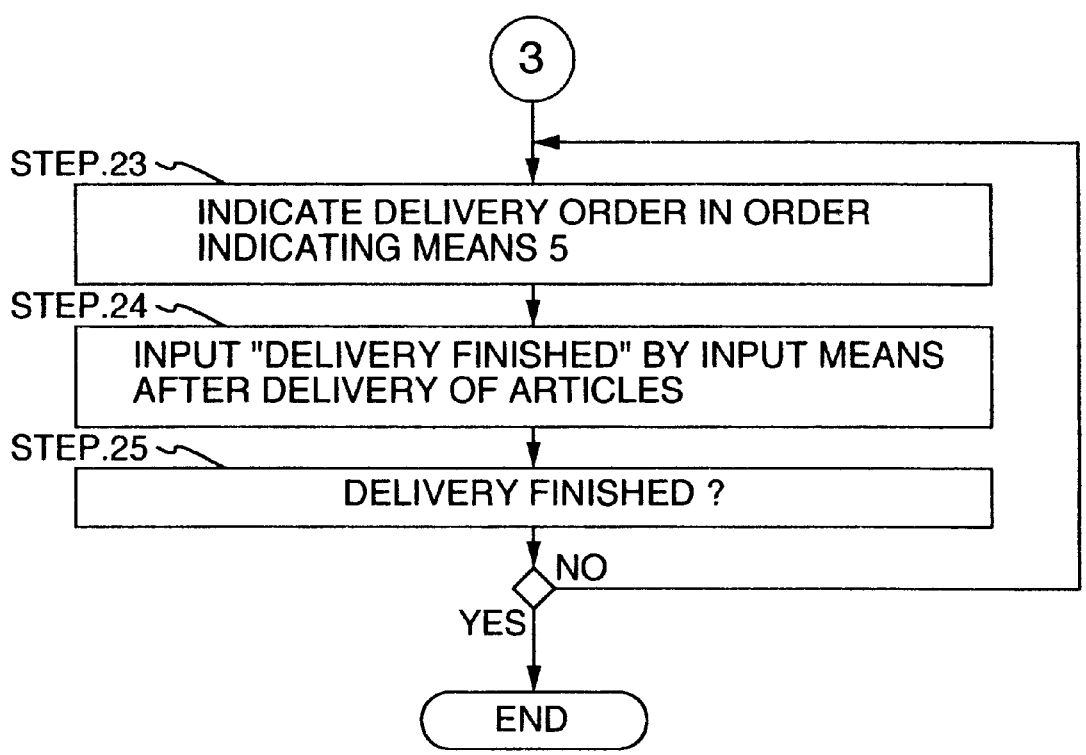
FIG. 11 is a flow chart continued from FIG. 10.

Next, another embodiment of an article delivery system of the present invention is shown in FIGS. 8 to 11. FIG. 8 is a schematic structural view of the article delivery system of this embodiment. In FIG. 8, solid lines indicate the movement of articles, and broken lines indicate the movement of information. Each of arrows, appearing hereinafter in this specification, indicates a direction of movement. FIGS. 9 to 11 show a flow chart indicating the procedure of arrangement, and step Nos., hereinafter used in the specification, indicate the procedure in FIGS. 9 to 11. The embodiment will now be described briefly.

As shown in FIG. 8, there are provided two sorting devices 1 (1a and 1b). The sorting device 1a is, for example, the letter sorting device 100 (shown in FIG. 2) for sorting ordinary letters 101, and the sorting device 1b is, for example, the parcel sorting device 120 (shown in FIG. 3) for sorting parcels 121.

A reader terminal 2 is the scanner 200 shown in FIG. 4, and deals with special articles 201 such as registered mail.

An information terminal 3 is an information receiving device 300 shown in FIG. 6, and receives, for example, electronic information 301 such as electronic mail, and prints it on a paper sheet 310. The paper sheet 310 has an indication of sorting information which can be recognized by the sorting device 1. Preferably, the printing is applied to the paper sheet 310 in such a manner that the paper sheet can be delivered in this printed condition.

First, the articles are moved into the respective devices, as indicated by arrows D. Sorting information of the article is procured by the use of the sorting information procuring means 10 provided in each device (step. 1). In this embodiment, it is assumed that the sorting information is represented by "m–n, X town, T city, I prefecture" where X is one of A to C, and each of m and n is one of 1 to 5.

Next, a device number and an identification number are added to the sorting information to form article information A (step. 2). The result is shown in FIGS. 12 to 15. In FIGS. 12 to 15, the device numbers are the numbers assigned to the respective devices. Device number 1 indicates the sorting device 1*a,* and device number 2 the sorting device 1*b,* device number 3 the reader terminal 2, and device number 4 the information terminal 3. With respect to the article numbers, article number 1 indicates ordinary letters 101 which can be dealt with by the sorting device 1*a*. The paper sheets 310, outputted from the information terminal 3, can be dealt with by the sorting device 1*a,* and therefore the same article number is assigned to the paper sheets 310. Article number 2 indicates the parcels 121, and article number 3 indicates the special articles 201. "file no." represents an electronic file storing an image of the article having the identification number (no.). Line numbers are given merely for explanation purposes, and therefore can be omitted.

Referring to one example of the article information A, the article of line number 12-1 in FIG. 12 is the letter 101 dealt by the sorting device 1*a,* and its identification number is 110001, and the address as sorting information is 3-1, A town, T city, I prefecture, and its form is stored in file 110001.

Such article information A are transmitted sequentially or at a time from the communication means 11 of each device to the order forming means 4 and the delivery management means 70 (step. 3 and arrows E). The delivery management means 70 renews the location of these articles in accordance with the article information A.

If the identification unit producing means 12 are provided, the identification number is recorded on the identification unit, and it is added to the article (step. 4).

The transmitted article information A are stored in the article information storage means 42 of the order forming means 4 (step. 5). FIG. 16 shows the article information A collected in the article information storage means 42. In FIG. 16, the article information A are arranged in the order of device numbers 1 to 4, but may be arranged in any manner at this stage.

When the procurement of the sorting information for all of the articles is finished (step. 6), the program proceeds to the stage of formation of the delivery order.

The article information A, stored in the article information storage means 42, are arranged in the order of delivery. To achieve this, reference delivery numbers, indicative of the delivery order, are derived (step. 7). Here, there is shown an example in which the reference order database 44 is used. As shown in FIG. 17, a data table, in which the sorting information and the reference delivery numbers are correspondingly associated with each other, is stored in the reference order database 44. In FIG. 17, although the sorting information and the reference delivery numbers are arranged in ascending order, the reference deliver y numbers are actually given in such a manner that the delivery time is shortened.

The information processing means 41 adds the corresponding reference delivery numbers to the article information A by reference to the article information storage means 42 and the reference order database 44, as shown in FIG. 19.

In FIG. 16, for example, th e sorting information of the article of line number 16-6 is "2-4. A town, T city, I prefecture". When searching the same sorting information in the reference order database 44 of FIG. 17, the information of line number 17-9, representing reference delivery number 0009, corresponds to it. Therefore, the sorting Information "2-4, A town, T city, I prefecture" and reference delivery number 0009 are correspondingly recorded as shown in line number 19-6 in FIG. 19.

In this manner, the reference delivery numbers are assigned to all of the article information A.

Then, the information processing means 41 arranges the reference delivery numbers in ascending order, using a sort algorithm (step. 8). At this time, the article information A are arranged in accordance with the corresponding reference delivery numbers. If two or more articles have the same reference delivery number, their article information are arranged in such a manner that their device numbers or article numbers are arranged in ascending order. Any sort algorithm method can be used here. One example is a bubble sort method. The bubble sort method will be briefly described. In FIG. 19, when comparing the reference delivery numbers of line numbers 19-1 and 19-2 with each other, the reference deliver number of line number 19-2 is larger, and the two are arranged in ascending order. Therefore, the two will not be moved. Then, when comparing the reference delivery numbers of line numbers 19-2 and 19-3 with each other, the two are arranged in ascending order, and therefore they will not be moved. Then, when comparing the reference deliver numbers of line numbers 19-3 and 19-4, the reference deliver number of line number 19-4 is smaller, and the two are not arranged in ascending order. Therefore, the article information A in line numbers 19-3 and 19-4 are exchanged with each other. This operation is effected until the last line. Then, the processing returns to the first line, and this operation is effected repeatedly, and when the exchange of the lines ceases to occur, this arranging operation is finished.

This result is shown in FIG. 20. With respect to the article information A (in FIG. 19) each having the corresponding reference delivery number added thereto, when the reference delivery numbers are arranged in ascending order, the article information A are also arranged in ascending order. As a result, delivery information B, indicating the delivery order, are obtained. Here, the reference delivery numbers are not always consecutive, and therefore are changed into consecutive numbers which are used as delivery numbers (step. 9).

This result is stored in the delivery information storage means 43 (step. 10), and it is first used for arranging the articles.

Here, the arrangement of the articles is classified into the type, in which the arrangement is effected by the sorting devices 1, and the type in which the arrangement is manually effected by the operator.

First, if there are any articles which can be arranged by the sorting device 1 (step. 11), the delivery information B are transmitted to the sorting device 1 (step. 12 and arrow F1). Preferably, the delivery information B to be transmitted are limited only to those articles to be handled by the sorting device 1 so that the amount of the data to be transmitted can be small.

Thus, the article information are arranged with the device numbers and the article numbers added thereto, and then all of the articles to be delivered are arranged, and thereafter only the necessary delivery information B can be transmitted to the sorting device for sorting the corresponding articles. By doing so, even if only one kind of articles can be sorted by the sorting device 1, sorting processing considering the order of deliver of the other articles which cannot undergo the sorting processing at the same time becomes possible.

In this embodiment, the ordinary letters 101 and the paper sheets 301, which have article number 1, are arranged by the sorting device 1*a*. Therefore, only those delivery information, having delivery number 1, are separated from the delivery information B and transmitted to the sorting device 1*a*. Also with respect to the article, the letters 101 and the paper sheets 310 are moved to the sorting device 1*a* as indicated by arrow G in FIG. 8.

In the sorting device 1*a*, the letters 101 and the paper sheets 310 are arranged in the order determined by the delivery information B (step. 13). At this time, the sorting information, read by the sorting device 1*a*, are compared respectively with the corresponding sorting information contained in the delivery information B, and by doing so, it can be confirmed that the letters 101 and the paper sheets 310 correspond to the delivery information B. As shown in FIG. 22, the delivery condition of the articles, sorted by the sorting device 1*a*, is changed from "before arrangement" to "after arrangement" (step. 14). In this embodiment, the item "delivery condition" in the separated delivery information B are rewritten in the sorting device 1*a*. Although it Is desirable that all of the letters 101 and all of the paper sheets 310 should be arranged by the sorting device 1*a*, there develops those letters which have failed to be sorted because of incomplete reading and the incomplete-conveyed condition. The arrangement condition of these letters, having failed to be sorted, is represented by "before arrangement", and by doing so, the letters, which have not yet been properly arranged, can be identified. In FIG. 22, the letters, indicated respectively by line numbers 22-8 and 22-16, are in the condition "before arrangement", and these are manually arranged separately.

When the arrangement by the sorting device 1*a* is finished (step. 15), this result is transmitted to the delivery order forming means 4 (step. 16 and arrow H).

On the other hand, with respect to those articles to be arranged by the operator, the delivery information B are transmitted to the arrangement indicating means 5 (step. 17 and arrow F2). If one operator arranges the articles, the arrangement indicating means 5 is one device. Here, each kind of articles are arranged separately from the other kind of articles, and therefore a plurality of arrangement indicating means 5*a* and 5*b* are used. The parcels 121 are arranged by the use of the arrangement indicating means 5*a*. With respect to the delivery information B to be transmitted from the delivery order forming means 4 to the arrangement indicating means 5*a*, those delivery information B, having article number 2, are selected among the delivery information B (shown in FIG. 21) in the delivery information storage means 43, and are transmitted to the arrangement indicating means 5*a*. If the special articles 201 are also to be arranged by the use of the arrangement indicating means 5*a*, the information, having article number 3, are selected, and are transmitted to the arrangement indicating means 5*b*.

When the arrangement by the sorting device 1*a* is finished, the delivery information B, including the result of arrangement by the sorting device 1*a*, are transmitted from the delivery order forming means 4 to the arrangement indicating means 5. These delivery information B are stored in the arrangment condition storage means 53 of the arrangement indicating means 5.

Next, the articles, which have not yet been arranged, are manually arranged by the operators as indicated by arrow J in FIG. 8. The arrangement indicating means 5 has two indicating methods, and one of the two methods can be selected (step. 18). One method is to display the sorting information of the articles on the display means 51 in the ascending or descending order of the arrangement (step. 19). The operator arranges the articles while comparing the addresses, displayed on the display means 51, with the addresses written on the articles. At this time, if the image information files (file no.) are displayed, the relevant articles can be recognized, so that the efficiency of the operation is enhanced. This method is effective when the amount of the articles to be arranged is relatively small, and when various forms of articles are to be arranged. The other method is to input the sorting information of the articles by the input means 52 and to display the delivery numbers corresponding to these articles (step. 20). Even if part of the sorting information is inputted, the delivery number of the corresponding article is displayed. Actually, however, much time and labor are required for inputting the sorting information. Therefore, preferably, the identification unit producing means 12 for attaching an identification unit to each article is provided in the sorting device 1 and so on, and the identification unit is attached to the article. With this method, the identification number is confirmed by the use of the identification unit confirming means 54 provided in the arrangement indicating means 5, so that the delivery number, corresponding to the identification number, can be displayed. This method is effective when the number of the articles to be arranged is relatively large, and when the articles are inserted in an arrangement row.

With respect to the arranged articles, the operator inputs the condition "after arrangement" by the use of the input means 52 (step. 21). Such arranging operation is repeated, and when the arrangement of all of the articles is finished (step. 22), an arrangement row of each kind of articles is formed. Here, an arrangement row T of letters 101 and paper sheets 310, an arrangement row U of parcels 121 and an arrangement row V of special articles 201 are formed as shown in FIG. 8.

These articles are loaded onto a carrier vehicle such as truck, and are delivered.

Figure 23:
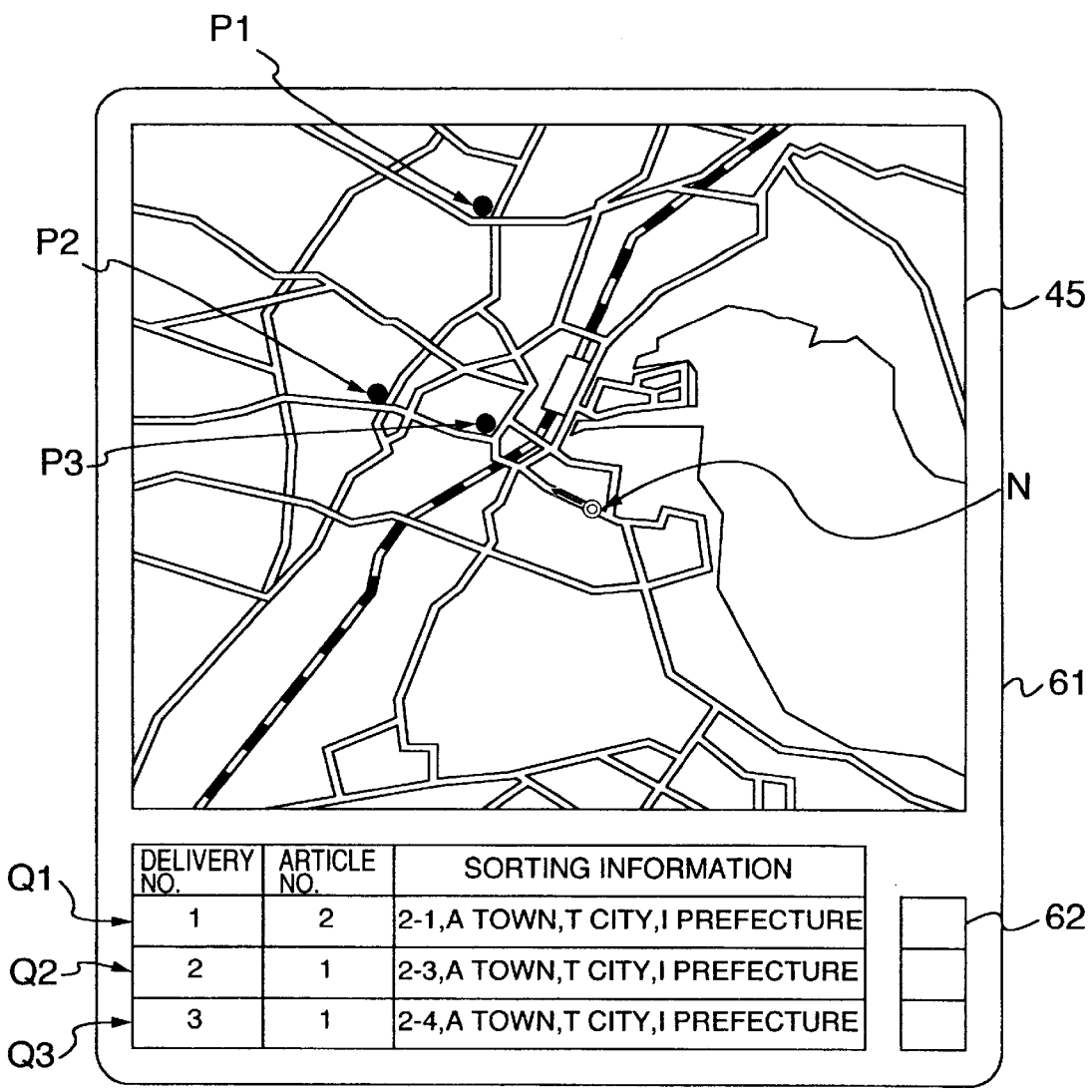
FIG. 23 is a view showing one example of display in display means 51.

At the time of delivery, the delivery indicating means 6 displays the delivery information B, transmitted from the delivery order forming means 4 (arrow F3), in the order of delivery, and indicates the article to be delivered next (step. 23 and arrow K). FIG. 23 shows one example of display on the display means 61. As shown in FIG. 23, the next delivery point (P1, P2 . . . ) is displayed on a map, and at the same time the article information (Q1, Q2 . . . ) of the article to be delivered next is displayed. The present position, obtained from the positioning means 7, is also displayed, and a path of delivery is indicated.

For example, with respect to the article (line number 21-1) to be delivered first, article number 2 is displayed, and therefore it is appreciated that this article is a parcel. Therefore, the first parcel 121 is taken out of the arrangement row U of parcels 121, and is delivered to a delivery point 8. Then, the fact that the delivery of this article has been finished is inputted by the use of the input means 62 (step 24). Here, the fact that the article has been delivered is inputted by touching a predetermined place displayed on the display means 61. Then, the delivery information B of the article (line number 21-2) to be delivered next is displayed. The article of line number 21-2 has article number 1, and therefore it is appreciated that this article is a letter 101, and therefore the first letter 101 is taken out of the arrangement row T of letters 101, and is delivered.

Such an operation is repeated for all of the articles (step. 25). Thus, by repeating the display of the delivery information B, the delivery and the inputting of "delivered", all of the articles can be delivered in the proper delivery order. Each time the article is delivered, information representative of "delivered" is transmitted to the delivery management means 70. Alternatively, these "delivered" information are transmitted at a time to the delivery management means 70 when the articles are delivered. The "delivered" information, transmitted each time the article is delivered or when the articles are delivered, is the delivery finish information C. The delivery management means 70 manages the article information A, the delivery management information B and the delivery finish information C, and therefore it becomes possible to effect the detailed management, for example, to answer a question about the condition of delivery of the articles to be delivered, and to manage the articles which are not yet delivered.

Thus, by using the system of this embodiment, a plurality of kinds of articles (letters 101 and paper sheets 310 in the above example) can be arranged in one row. Even if a plurality of kinds of articles are arranged in a plurality of rows (that is, a row of letters 101, a row of parcels 121 and a row of special articles 201 in the above example), respectively, the delivery information are unified and indicated, and therefore any deliver point (destination) will not be omitted, and the burden on the operator can be reduced.

In the above example, the reference delivery numbers are obtained from the reference order database 44. However, when a plurality of kinds of articles are to be handled, a delivery path can be optimized by obtaining the reference delivery numbers from the map information database 45.

Figure 24:
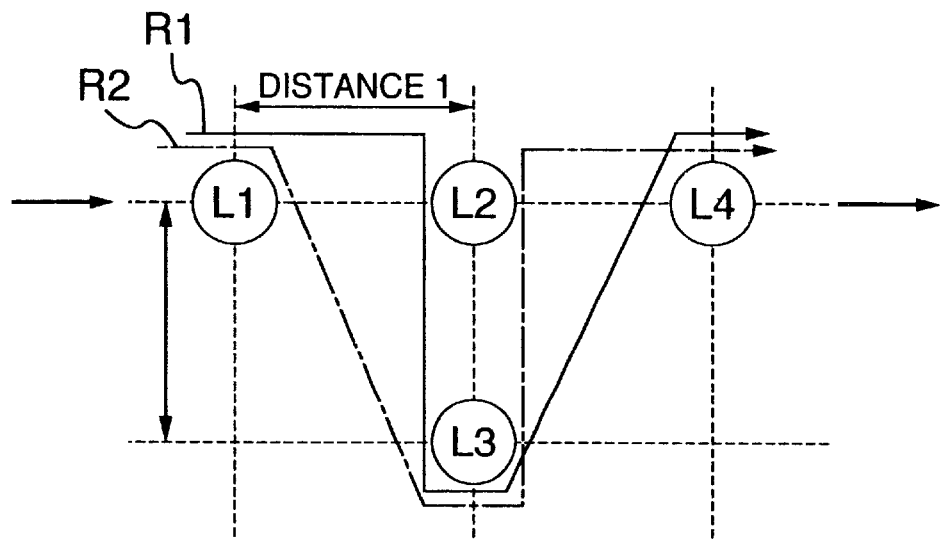
FIG. 24 is a diagram explanatory of a method of determining the delivery order in the invention.
Figure 25:
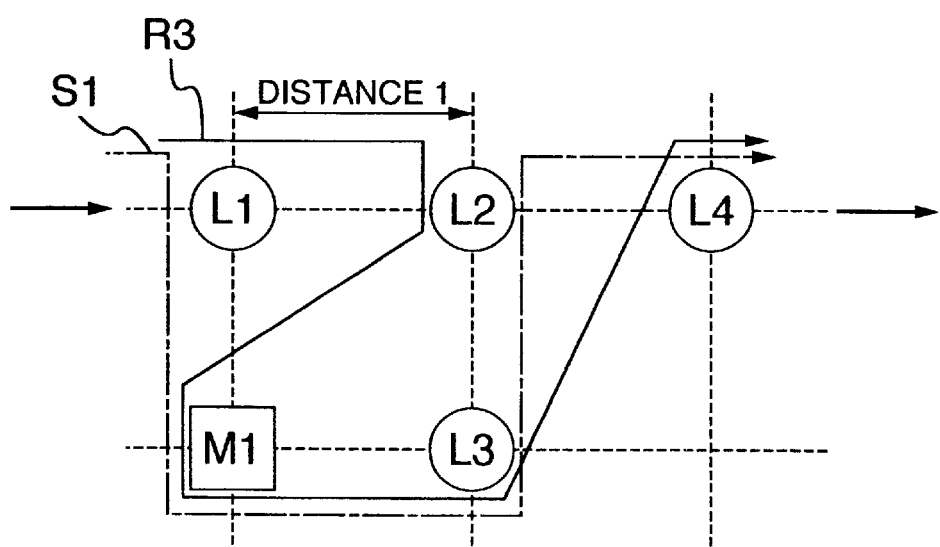
FIG. 25 is a diagram explanatory of a method of determining the delivery order in the invention.

FIGS. 24 and 25 show an example which is simplified for description purposes. In FIG. 24, L1 to L4 denotes points to which a certain kind of articles (for example, letters) are to be delivered, respectively. Let's assume that the distance (length) of one side of a square, indicated by broken lines, is 1. In this example, if the delivery is started from the point L1, and is finished at the point L4, there are two delivery orders which provide the shortest distance. One deliver order R1 is L1→L2→L3→L4. The other deliver order R2 is L1→L3→L2→L4. In both of the two delivery orders, the distance of movement is $(2+\sqrt{2})$, and here the delivery order R1 is selected for explanation purposes.

Let's assume that there is a point M1 to which another kind of article (for example, a parcel) is to be delivered.

In the prior art technique, sorting information are not managed in an unified manner, and therefore the point M1 is incorporated into the delivery order R1. Several delivery orders can be proposed, and one of the delivery orders, which provide the shortest distance of movement, is a delivery order R3 represented by L1→L2→M1→L3→L4. In this case, the movement distance is $(2+\sqrt{2})$.

On the other hand, in the system of this embodiment, the sorting information are managed in a unified manner, and therefore there is obtained a delivery order S1 which has the shortest distance of movement, and is expressed by L1→M1→L3→L2→L4. The movement distance of the delivery order S1 is 4, and is shorter than the movement distance $(2+2\sqrt{2})$ of the delivery order R3. Thus, preferably, the delivery order is formed from the sorting information of the plurality of kinds of articles.

With respect to the order of the points denoted by L, this order is L1→L3→L2→L4, and this order is different from the delivery order R1 in that L2 and L3 are exchanged with each other. Therefore, a delivery path for a plurality of kinds of articles is first found, and then a delivery path for one kind of articles is extracted from it, and by doing so, a better result can be obtained.

Thus, the delivery order forming means 4 is connected to the plurality of sorting information reading means 10, and the sorting information are managed in a unified manner, and by doing so, there can be obtained the delivery order which enables the delivery in a shorter time.

In the above example, the plurality of kinds of articles are handled, and therefore the plurality of arrangement rows are provided. However, even if articles of the same kind are handled, a plurality of arrangement rows can be provided as shown in FIG. 26.

For example, there are occasions when the articles are collected sequentially in time, and the amount of the articles is large. In this case, if the arrangement of the articles is effected after all of the articles are collected, much time is required. Therefore, each time the articles are collected in a certain amount, the arrangement of the articles are effected. In this case, although the articles are of the same kind, the articles are arranged in a plurality of rows T1 to T3. Also in this case, the delivery indicating means 6 indicates the arrangement row (T1 to T3) out of which the article is to be taken, and by doing so, the articles can be delivered according to a delivery path. For this purpose, information (e.g. the number and time), distinguishing the arrangement rows from one another, is added to the article information A.

Figure 26:
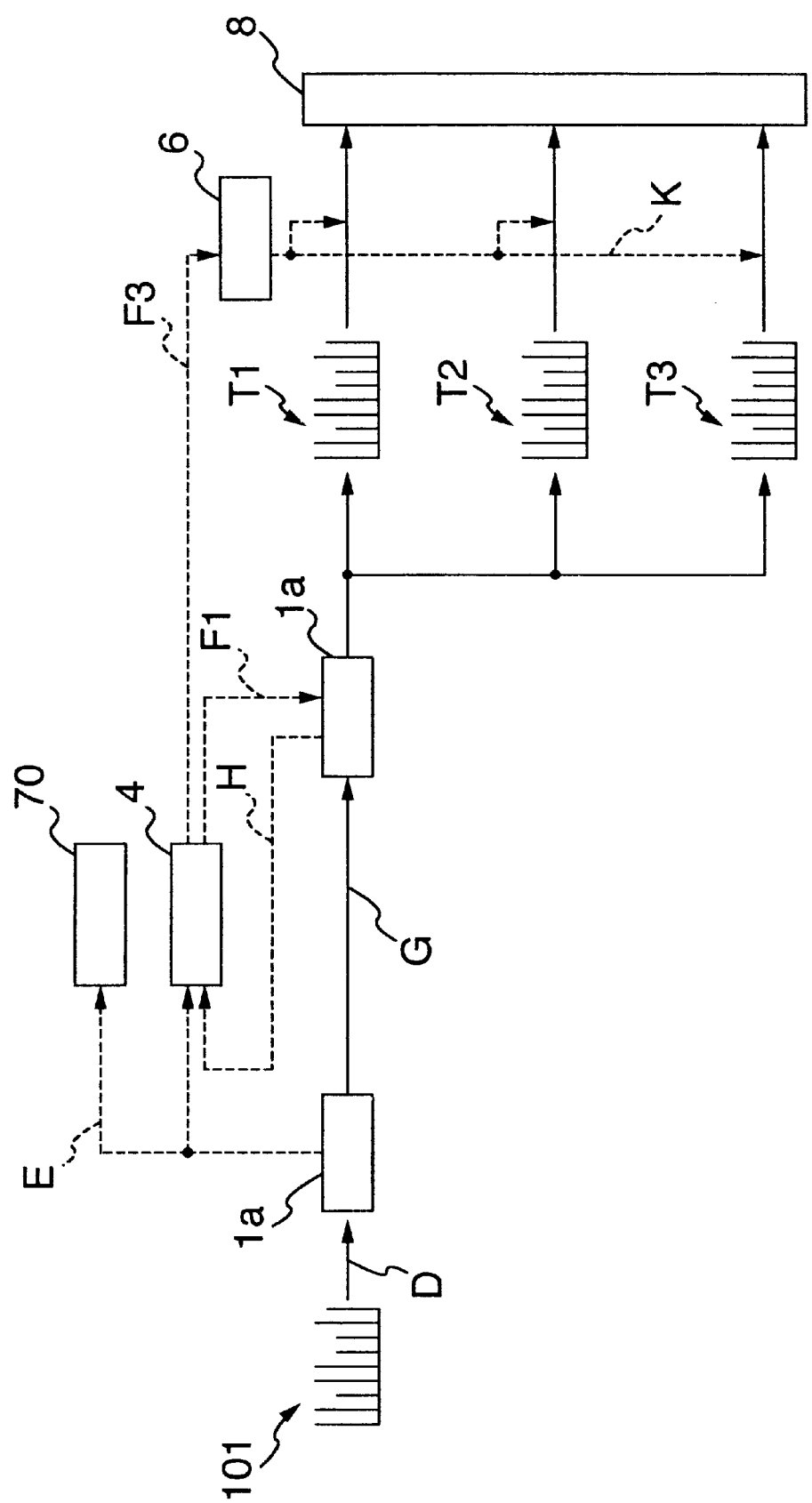
FIG. 26 is a schematic structural view of a further embodiment of an article delivery system of the invention.

Even if FIG. 8 and FIG. 26 are combined together, that is, if a plurality of kinds of articles are handled, and the articles of the same kinds are arranged in a plurality of rows, this can be applied in a similar manner.

As is clear from the above embodiment of the invention, when a plurality of kinds of articles are delivered at the same time, the delivery points can be managed in a unified manner. Therefore, the plurality of kinds of articles can be combined into one arrangement row. Also, even when a plurality of arrangement rows are formed, the delivery order can be managed in a unified manner.

As is clear from the above embodiment of the invention, the delivery order can be more effectively found by determining the delivery order on the basis of the delivery points of a plurality of kinds of articles as compared with the case of determining the delivery order of a plurality of kinds of articles on the basis of the delivery order of one kind of articles.

In the present invention, when delivering a plurality of kinds of articles, the omission of the delivery point is eliminated, and the proper delivery order can be determined. And besides, when delivering a plurality of kinds of articles, the burden on the operator in the sorting operation and the delivering operation can be reduced.

What is claimed is:

1. An article delivery system for arranging plural kinds of articles having sorting information in accordance with the sorting information so as to help the delivery of the articles, comprising:

a plurality of article information procuring means for respectively procuring article information each containing the sorting information and kind information corresponding to the article, said plurality of article information procuring means being provided for every kind of article;

delivery order forming means for arranging said article information of said plural kinds of articles in accordance with said sorting information in said article information procured by said plurality of article information procuring means and forming delivery order of the plural kinds of articles;

arrangement indicating means for indicating arrangement order formed by said delivery order forming means for every kind of article; and delivery indicating means for indicating the delivery order of the plural kinds of articles formed by said delivery order forming means.

2. An article delivery system according to claim 1, further comprising order indicating means for indicating the arrangement order or the delivery order formed by said delivery order forming means.

3. An article delivery system according to claim 1, further comprising an article sorting device which includes at least one of said plurality of article information procuring means, and sorts the articles in accordance with the sorting information procured by said article information procuring means and the article arrangement order formed by said delivery order forming means.

4. An article delivery system according to claim 1, wherein at least one of said plurality of article information procuring means includes identification unit producing means for producing an identification unit, containing identification information corresponding to the article, for said article, and there is provided identification unit confirming means capable of confirming said identification information from said identification unit, and there is provided order indicating means for indicating the deliver order, formed by said delivery order forming means, in accordance with said identification information.

5. An article delivery system according to claim 1, wherein at least one of said plurality of article information procuring means comprises an article information procuring means which can procure information of form of the article, and there is provided order indicating means which indicates the delivery order, formed by said delivery order forming means, and displays form information of the article.

6. An article delivery system according to claim 1, wherein at least one of said plurality of article information procuring means includes a reader for reading characters or bar code.

7. An article delivery system according to claim 1, wherein said order indicating means is connected to positioning means for measuring a position where said order indicating means exists, and displays the position upon measurement.

8. An article delivery system for arranging articles in accordance with sorting information, provided thereon, so as to help the delivery of the articles, comprising:

article information procuring means for procuring article information containing at least the sorting information and kind information corresponding to the article; and delivery order forming means for receiving said article information from said article information procuring means, and for arranging said article information, each containing at least the sorting information, in the order of delivery, and for transmitting said arranged article information as a unit of arrangement of the articles.

9. An article delivery system for arranging articles in accordance with sorting information, provided thereon, so as to help the delivery of the articles, comprising:

article information procuring means for procuring article information containing at least the sorting information and kind information corresponding to the article;

delivery order forming means for storing said article information of each article procured by said article information procuring means, and for arranging said article information in the order of delivery in accordance with said sorting information in said article information, and for transmitting said arranged article information in accordance with arranging processing of said articles; and arranging means for helping the arranging processing of said articles in accordance with said arranged article information transmitted from said delivery order forming means.

10. An article delivery system according to claim 9, wherein said delivery order forming means transmits separately said arranged article information that comprises every said kind information of articles to be processed by said arranging means.

11. An article delivery system according to claim 9, wherein said delivery order forming means transmits separately said arranged article information that comprises every arrangement row of articles to be processed by said arranging means.

12. An article information processing apparatus comprising:

storage means for storing article information of articles procured by a plurality of article information procuring means for procuring the article information each containing at least sorting information and kind information corresponding to the article; and a processing portion which arranges said article information in the order of delivery in accordance with said sorting information in said article information, and transmits said arranged article information in accordance with arranging processing of said articles.

13. An article information processing apparatus according to claim 12, wherein said arranged article information are transmitted separately that comprises every said kind information of articles to be processed by the arranging processing.

14. An article information processing apparatus according to claim 12, wherein said arranged article information are transmitted separately that comprises every arrangement row of articles to be processed by the arranging processing.

* * * * *